(12) United States Patent
Wael et al.

(10) Patent No.: US 10,942,142 B2
(45) Date of Patent: Mar. 9, 2021

(54) METHODS AND APPARATUS FOR ANALYTE DETECTION USING FLUORINATED PHTHALOCYANINES

(71) Applicants: Seton Hall University, South Orange, NJ (US); University of Antwerp, Antwerp (BE)

(72) Inventors: Karolien De Wael, Sint-Pauwels (BE); Sergiu M. Gorun, New York, NY (US); Stanislav Trashin, Antwerp (BE); Erik N. Carrión, West Orange, NJ (US)

(73) Assignees: Seton Hall University, South Orange, NJ (US); University of Antwerp

( * ) Notice: Subject to any disclaimer, the term of this patent is extended or adjusted under 35 U.S.C. 154(b) by 185 days.

(21) Appl. No.: 16/034,705

(22) Filed: Jul. 13, 2018

(65) Prior Publication Data

US 2019/0017955 A1  Jan. 17, 2019

Related U.S. Application Data

(60) Provisional application No. 62/532,118, filed on Jul. 13, 2017.

(51) Int. Cl.
*G01N 27/30* (2006.01)
*C25B 11/04* (2006.01)
*C07F 3/06* (2006.01)

(52) U.S. Cl.
CPC ............. *G01N 27/305* (2013.01); *C07F 3/06* (2013.01); *C25B 11/0489* (2013.01)

(58) Field of Classification Search
None
See application file for complete search history.

(56) References Cited

U.S. PATENT DOCUMENTS 9,260,630 B2  2/2016  Gorun et al.

FOREIGN PATENT DOCUMENTS

CN  102221569 A  * 10/2011  ............. G01N 27/02

OTHER PUBLICATIONS

Weissbecker et al., "Switching of the Rate-limiting Step in the Electrochromic Reduction of Fluorinated Phthalocyanine Thin Films by Decreased Intermolecular Coupling," Electrochemica Acta 157 (2015) 232-244 (Year: 2015).*

Nagel et al., "Electrochromic Switching of Evaporated Thin Films of Bulky, Electronic Deficient Metallo-Phthalocyanines," J. Phys. Chem. C 2011, 115, pp. 8759-8767 (Year: 2011).*

(Continued)

*Primary Examiner* — Alexander S Noguerola
(74) *Attorney, Agent, or Firm* — Lerner, David, Littenberg, Krumholz & Mentlik, LLP

(57) ABSTRACT

Methods and apparatus for detecting an analyte using fluorinated phthalocyanines is disclosed herein. A method for detecting an analyte includes illuminating an analyte solution which contacts an electrode comprising a conductive material having a photosensitizer coupled thereto to generate a reactive oxygen species, wherein the photosensitizer is a fluorinated pthalocyanine having a metal or a non-metal center, oxidizing an analyte present in the analyte solution with the reactive oxygen species to form an oxidized analyte, and detecting a current resulting from the reduction of the oxidized analyte at the electrode.

19 Claims, 20 Drawing Sheets

(56) References Cited

OTHER PUBLICATIONS

EPO computer-generated English language translation of Ji et al. CN 102221569 A, downloaded Apr. 16, 2020 (Year: 2011).*
Oekermann et al., "Influence of Electron-withdrawing Substituents on Photoelectrochemical Surface Phenomena at Phthalocyanine Thin Film Electrodes," J. Porphyrins Phthalocyanines 3, 444-452 (1999) (Year: 1999).*
Moons H, Lapok L, Loas A, Van Doorslaer S, Gorun SM. Synthesis, X-ray structure, magnetic resonance, and DFT analysis of a soluble copper (II) phthalocyanine lacking C—H bonds. Inorganic chemistry. Sep. 3, 2010;49(19):8779-89.
Khoshtariya DE, Wei J, Liu H, Yue H, Waldeck DH. Charge-transfer mechanism for cytochrome c adsorbed on nanometer thick films. Distinguishing frictional control from conformational gating. Journal of the American Chemical Society. Jun. 25, 2003;125(25):7704-14.
Rodríguez-López JN, Lowe DJ, Hernández-Ruiz J, Hiner AN, García-Cánovas F, Thorneley RN. Mechanism of reaction of hydrogen peroxide with horseradish peroxidase: identification of intermediates in the catalytic cycle. Journal of the American Chemical Society. Dec. 5, 2001;123(48):11838-47.
Rezaei B, Damiri S. Electrochemistry and adsorptive stripping voltammetric determination of amoxicillin on a multiwalled carbon nanotubes modified glassy carbon electrode. Electroanalysis: An International Journal Devoted to Fundamental and Practical Aspects of Electroanalysis. Jul. 2009;21(14):1577-86.
Rosatto SS, Kubota LT, de Oliveira Neto G. Biosensor for phenol based on the direct electron transfer blocking of peroxidase immobilising on silica-titanium. Analytica Chimica Acta. May 19, 1999;390(1-3):65-72.
Rosatto SS, Sotomayor PT, Kubota LT, Gushikem Y. SiO2/Nb2O5 sol-gel as a support for HRP immobilization in biosensor preparation for phenol detection. Electrochimica Acta. Oct. 30, 2002;47(28):4451-8.
Rossier JS, Girault HH. Enzyme linked immunosorbent assay on a microchip with electrochemical detection. Lab on a Chip. Nov. 26, 2001;1(2)153-7.
Goyal RN. Estimation of amoxicillin in presence of high concentration of uric acid and other urinary metabolites using an unmodified pyrolytic graphite sensor. Journal of the Electrochemical Society. Jan. 1, 2015;162(1):G8-13.
Santos AS, Pereira AC, Sotomayor MD, Tarley CR, Durán N, Kubota LT. Determination of Phenolic Compounds Based on Co-Immobilization of Methylene Blue and HRP on Multi-Wall Carbon Nanotubes. Electroanalysis: An International Journal Devoted to Fundamental and Practical Aspects of Electroanalysis. Mar. 2007;19(5):549-54.
Santos DP, Bergamini MF, Zanoni MV. Voltammetric sensor for amoxicillin determination in human urine using polyglutamic acid/glutaraldehyde film. Sensors and actuators B: Chemical. Aug. 12, 2008;133(2):398-403.
Schlothauer JC, Hackbarth S, Jäger L, Drobniewski K, Patel H, Gorun SM, Röder B. Time-resolved singlet oxygen luminescence detection under photodynamic therapy relevant conditions: comparison of ex vivo application of two photosensitizer formulations. Journal of biomedical optics. Nov. 2012;17(11):115005-1-115005-11.
Schoukroun-Barnes LR, Glaser EP, White RJ. Heterogeneous electrochemical aptamer-based sensor surfaces for controlled sensor response. Langmuir. Jun. 16, 2015;31(23):6563-9.
Scully Jr FE, Hoigné J. Rate constants for reactions of singlet oxygen with phenols and other compounds in water. Chemosphere. Jan. 1, 1987;16(4):681-94.
Uslu B, Biryol I. Voltammetric determination of amoxicillin using a poly (N-vinyl imidazole) modified carbon paste electrode. Journal of pharmaceutical and biomedical analysis. Jul. 1999;20(3):591-598.
Versporten A, Coenen S, Adriaenssens N, Muller A, Minalu G, Faes C, Vankerckhoven V, Aerts M, Hens N, Molenberghs G, Goossens H. European Surveillance of Antimicrobial Consumption (ESAC): outpatient penicillin use in Europe (1997-2009). Journal of antimicrobial chemotherapy. Dec. 1, 2011;66(suppl_6):vi13-23.
Wang J. Electrochemical biosensors: towards point-of-care cancer diagnostics. Biosensors and Bioelectronics. Apr. 15, 2006;21(10):1887-92.
Wang GL, Jiao HJ, Liu KL, Wu XM, Dong YM, Li ZJ, Zhang C. A novel strategy for the construction of photoelectrochemical sensors based on quantum dots and electron acceptor: The case of dopamine detection. Electrochemistry Communications. Apr. 1, 2014;41:47-50.
Weijer R, Broekgaarden M, Kos M, van Vught R, Rauws EA, Breukink E, van Gulik TM, Storm G, Heger M. Enhancing photodynamic therapy of refractory solid cancers: Combining second-generation photosensitizers with multi-targeted liposomal delivery. Journal of Photochemistry and Photobiology C: Photochemistry Reviews. Jun. 1, 2015;23:103-31.
Wilkinson F, Helman WP, Ross AB. Rate constants for the decay and reactions of the lowest electronically excited singlet state of molecular oxygen in solution. An expanded and revised compilation. Journal of Physical and Chemical Reference Data. Mar. 1995;24(2):663-77.
Wolfbeis OS. Probes, sensors, and labels: why is real progress slow?. Angewandte Chemie International Edition. Sep. 16, 2013;52(38):9864-5.
Yang S, Li Y, Jiang X, Chen Z, Lin X. Horseradish peroxidase biosensor based on layer-by-layer technique for the determination of phenolic compounds. Sensors and Actuators B: Chemical. Apr. 26, 2006;114(2):774-80.
Yang S, Chen Z, Jin X, Lin X. HRP biosensor based on sugar-lectin biospecific interactions for the determination of phenolic compounds. Electrochimica acta. Oct. 5, 2006;52(1):200-5.
Absalan G, Akhond M, Ershadifar H. Highly sensitive determination and selective immobilization of amoxicillin using carbon ionic liquid electrode. Journal of Solid State Electrochemistry. May 28, 2015;19(8):2491-9.
Bahadir EB, Sezgintürk MK. Applications of commercial biosensors in clinical, food, environmental, and biothreat/biowarfare analyses. Analytical Biochemistry. Mar. 16, 2015;478:107-20.
Bench BA, Beveridge A, Sharman WM, Diebold GJ, van Lier JE, Gorun SM. Introduction of bulky perfluoroalkyl groups at the periphery of zinc perlluorophthalocyanine: chemical, structural, electronic, and preliminary photophysical and biological effects. Angewandte Chemie. Mar. 1, 2002;114(5):773-6.
Bergamini MF, Teixeira MF, Dockal ER, Bocchi N, Cavalheiro ÉT. Evaluation of different voltammetric techniques in the determination of amoxicillin using a carbon paste electrode modified with [N, N'-ethylenebis (salicylideneaminato)] oxovanadium (IV). Journal of the Electrochemical Society. Mar. 28, 2006;153(5):E94-8.
Beveridge AC, Bench BA, Gorun SM, Diebold GJ. Evaluation of photodynamic therapy agents through transient grating measurements. The Journal of Physical Chemistry A. Jun. 26, 2003;107(25):5138-43.
Chekin F, Gorton L, Tapsobea I. Direct and mediated electrochemistry of peroxidase and its electrocatalysis on a variety of screen-printed carbon electrodes: amperometric hydrogen peroxide and phenols biosensor. Analytical and bioanalytical chemistry. Jan. 1, 2015;407(2):439-46.
Chen Z, Xi F, Yang S, Wu Q, Lin X. Development of a bienzyme system based on sugar-lectin biospecific interactions for amperometric determination of phenols and aromatic amines. Sensors and Actuators B: Chemical. Nov. 17, 2007;130(2):900-7.
Chiu MH, Chang JL, Zen JM. An Analyte Derivatization Approach for Improved Electrochemical Detection of Amoxicillin. Electroanalysis: An International Journal Devoted to Fundamental and Practical Aspects of Electroanalysis. Jul. 2009;21(14):1562-7.
DeRosa MC, Crutchley RJ. Photosensitized singlet oxygen and its applications. Coordination Chemistry Reviews. Nov. 1, 2002;233:351-71.
Díez-Mato E, Cortezón-Tamarit FC, Bogialli S, García-Fresnadillo D, Marazuela MD. Phototransformation of model micropollutants

(56) References Cited

OTHER PUBLICATIONS in water samples by photocatalytic singlet oxygen production in heterogeneous medium. Applied Catalysis B: Environmental. Jun. 6, 2014;160:445-55.
Dill K, Ghindilis A, Schwarzkopf K. Multiplexed analyte and oligonucleotide detection on microarrays using several redox enzymes in conjunction with electrochemical detection. Lab on a Chip. Jun. 19, 2006;6(8)1052-5.
Ensafi AA, Allafchian AR, Rezaei B. Multiwall carbon nanotubes decorated with FeCr 2 O 4, a new selective electrochemical sensor for amoxicillin determination. Journal of Nanoparticle Research. Oct. 21, 2012;14(11):1244.
Fernandez JM, Bilgin MD, Grossweiner LI. Singlet oxygen generation by photodynamic agents. Journal of Photochemistry and Photobiology B: Biology. Jan. 1, 1997;37(1-2):131-40.
Gao Z, Tansil NC. An ultrasensitive photoelectrochemical nucleic acid biosensor. Nucleic acids research. Jul. 18, 2005;33(13):e123-.
Garcia NA. New trends in photobiology: Singlet-molecular-oxygen-mediated photodegradation of aquatic phenolic pollutants. A kinetic and mechanistic overview. Journal of Photochemistry and Photobiology B: Biology. Mar. 1, 1994;22(3):185-96.
Ghogare AA, Greer A. Using singlet oxygen to synthesize natural products and drugs. Chemical reviews. Apr, 29, 2016;116(17):9994-10034.
Grosvenor AJ, Morton JD, Dyer JM. Profiling of residue-level photo-oxidative damage in peptides. Amino Acids. Jun. 1, 2010;39(1):285-96.
Gryglik D, Miller JS, Ledakowicz S. Singlet molecular oxygen application for 2-chlorophenol removal. Journal of hazardous materials. Apr. 20, 2007;146(3):502-7.
Heller A, Feldman B. Electrochemical glucose sensors and their applications in diabetes management. Chemical reviews. May 9, 2008;108(7):2482-505.
Imabayashi SI, Kong YT, Watanabe M. Amperometric biosensor for polyphenol based on horseradish peroxidase immobilized on gold electrodes. Electroanalysis: An International Journal Devoted to Fundamental and Practical Aspects of Electroanalysis. Apr. 2001;13(5):408-12.
Ismail F, Adeloju SB, Moline AN. Fabrication of a single layer and bilayer potentiometric biosensors for penicillin by galvanostatic entrapment of penicillinase into polypyrrole films. Electroanalysis. Dec. 2014;26(12):2607-18.
Jazbutyte V, Thum T. MicroRNA-21: from cancer to cardiovascular disease. Current drug targets. Aug. 1, 2010;11(8):926-35.
Kafi AK, Chen A. A novel amperometric biosensor for the detection of nitrophenol. Talanta. Jun. 30, 2009;79(1):97-102.
Kissinger PT. Biosensors—a perspective. Biosensors and Bioelectronics. Jun. 15, 2005;20(12):2512-6.
Koide K, Tracey MP, Bu X, Jo J, Williams MJ, Welch CJ. A competitive and reversible deactivation approach to catalysis-based quantitative assays. Nature communications. Feb. 19, 2016;7:10691.
Kokkinos C, Economou A, Prodromidis MI. Electrochemical immunosensors: Critical survey of different architectures and transduction strategies. TrAC Trends in Analytical Chemistry. May 1, 2016;79:88-105.
Korkut S, Keskinler B, Erhan E. An amperometric biosensor based on multiwalled carbon nanotube-poly (pyrrole)-horseradish peroxidase nanobiocomposite film for determination of phenol derivatives. Talanta. Sep. 15, 2008;76(5):1147-52.
Lakshmipriya T, Gopinath SC, Tang TH. Biotin-streptavidin competition mediates sensitive detection of biomolecules in enzyme linked immunosorbent assay. PloS one. Mar. 8, 2016;11(3):e0151153. pp. 1-14.
Lemp E, Valencia C, Zanocco AL. Solvent effects on reactions of singlet molecular oxygen, O2 (1?g), with antimalarial drugs. Journal of Photochemistry and Photobiology A: Chemistry. Nov. 1, 2004;168(1-2):91-6.

Lequin RM. Enzyme immunoassay (EIA)/enzyme-linked immunosorbent assay (ELISA). Clinical chemistry. Dec. 1, 2005;51(12):2415-8.
Leznoff CC, Sosa-Sanchez JL. Polysubstituted phthalocyanines by nucleophilic substitution reactions on hexadecafluorophthalocyanines. Chemical Communications. Jan. 13, 2004(3):338-9.
Li C, Hoffman MZ. Oxidation of phenol by singlet oxygen photosensitized by the tris (2, 2 '-bipyridine) ruthenium (II) ion. The Journal of Physical Chemistry A. Jun. 29, 2000;104(25):5998-6002.
Lindgren A, Emnús J, Ruzgas T, Gorton L, Marko-Varga G. Amperometric detection of phenols using peroxidase-modified graphite electrodes. Analytica chimica acta. Jul. 30, 1997;347(1-2):51-62.
Lundqvist H, Dahlgren C. Isoluminol-enhanced chemiluminescence: a sensitive method to study the release of superoxide anion from human neutrophils. Free Radical Biology and Medicine. Jan. 1, 1996;20(6):785-92.
Marin ML, Santos-Juanes L, Argues A, Amat AM, Miranda MA. Organic photocatalysts for the oxidation of pollutants and model compounds. Chemical reviews. Oct. 31, 2011;112(3):1710-50.
Mello LD, Sotomayor MD, Kubota LT. HRP-based amperometric biosensor for the polyphenols determination in vegetables extract. Sensors and Actuators B: Chemical. Dec. 1, 2003;96(3):636-45.
Minnes R, Weitman H, Lee HJ, Gorun SM, Ehrenberg B. Enhanced Acidity, Photophysical Properties and Liposome Binding of Perfluoroalkylated Phthalocyanines Lacking C—H Bonds. Photochemistry and photobiology. Mar. 2006;82(2):593-9.
Nemiroski A, Christodouleas DC, Hennek JW, Kumar AA, Maxwell EJ, Femandez-Abedul MT, Whitesides GM. Universal mobile electrochemical detector designed for use in resource-limited applications. Proceedings of the National Academy of Sciences. Aug. 19, 2014;111(33):11984-9.
Neto SY, Luz RD, Damos FS. Visible LED light photoelectrochemical sensor for detection of L-Dopa based on oxygen reduction on TiO2 sensitized with iron phthalocyanine. Electrochemistry Communications. Jan. 1, 2016;62:1-4.
Park S, Boo H, Chung TD. Electrochemical non-enzymatic glucose sensors. Analytica chimica acta. Jan. 18, 2006;556(1):46-57.
Piwowar K, Blacha-Grzechnik A, Bernas P, Zak J. Phenol degradation in heterogeneous system generating singlet oxygen employing light activated electropolymerized phenothiazines. Applied Surface Science. Dec. 30, 2015;359:426-31.
Dutta G, Kim S, Park S, Yang H. Washing-free heterogeneous immunosensor using proximity-dependent electron mediation between an enzyme label and an electrode. Analytical chemistry. Apr. 23, 2014;86(9):4589-95.
Glavan AC, Christodouleas DC, Mosadegh B, Yu HD, Smith BS, Lessing J, Fernandez-Abedul MT, Whitesides GM. Folding analytical devices for electrochemical ELISA in hydrophobic RH paper. Analytical chemistry. Dec. 3, 2014;86(24):11999-2007.
Ma W, Wang L, Zhang N, Han D, Dong X, Niu L. Biomolecule-free, selective detection of o-diphenol and its derivatives with WS2/TiO2-based photoelectrochemical platform. Analytical chemistry. Apr. 15, 2015;87(9):4844-50.
Richardson SD, Kimura SY. Water analysis: emerging contaminants and current issues. Analytical chemistry. Dec. 14, 2015;88(1):546-82.
Munteanu FD, Lindgren A, Émneus J, Gorton L, Ruzgas T, Csöregi E, Ciucu A, Van Huystee RB, Gazaryan IG, Lagrimini LM. Bioelectrochemical monitoring of phenols and aromatic amines in flow injection using novel plant peroxidases. Analytical chemistry. Jul. 1, 1998;70(13):2596-600.
Briviba K, Devasagayam TP, Sies H, Steenken S. Selective para-hydroxylation of phenol and aniline by singlet molecular oxygen. Chemical research in toxicology. Jul. 1993;6(4):548-53.
Gerdes R, Lapok L, Tsaryova O, Wöhrle D, Gorun SM. Rational design of a reactive yet stable organic-based photocatalyst. Dalton Transactions. Jan. 8, 2009; (7):1098-100.
Loas A, Gerdes R, Zhang Y, Gorun SM. Broadening the reactivity spectrum of a phthalocyanine catalyst while suppressing its nucleophilic, electrophilic and radical degradation pathways. Dalton Transactions. Mar. 23, 2011;40(19):5162-5.

(56) References Cited

OTHER PUBLICATIONS

Moons H, Loas A, Gorun SM, Van Doorslaer S. Photoreduction and light-induced triplet-state formation in a single-site fluoroalkylated zinc phthalocyanine. Dalton Transactions. Oct. 28, 2014;43(40):14942-8.

* cited by examiner

METHODS AND APPARATUS FOR ANALYTE DETECTION USING FLUORINATED PHTHALOCYANINES

CROSS-REFERENCE TO RELATED APPLICATIONS

This application claims priority to U.S. Provisional Application No. 62/532,118, filed on Jul. 13, 2017, which is incorporated herein by reference.

FIELD OF THE INVENTION

The present disclosure relates generally to the field of analyte detection.

BACKGROUND

The use of enzymes for chemical analysis is well documented. Horseradish peroxidase (HRP), a typical example, has been employed either as a selective catalyst to transform an analyte into an easily detectable product or as an enzymatic label in immunosorbent assays and related techniques. (Koide K, et al., Nat. Commun. 7, 10691 (2016); Lundqvist H, et al., Free Radical Biol. Med. 20, 785-792 (1996); Lakshmipriya T, et al., PLoS One 11, e0151153 (2016); Lequin R M, Clin. Chem. 51, 2415-2418 (2005); Dill K, et al., Lab Chip 6, 1052-1055 (2006)) The advantage of enzymes is their catalytic signal amplification, which translates into high sensitivity and low limits of detection (LOD). Enzyme based reagents, in combination with a cost efficient and straightforward electrochemical detection method could lead to portable, selective and sensitive sensors not unlike the widely used personal glucose meters. (Nemiroski A, et al., Proc. Natl. Acad. Sci. U.S.A. 111, 11984-11989 (2014); Wang J, Biosens. Bioelectron. 21, 1887-1892 (2006); Heller A, et al., Chem. Rev. 108, 2482-2505 (2008))

Several research groups have advanced over last three decades the electrochemical detection of phenols at HRP modified electrodes as well as the use of HRP and alkaline phosphatase (ALP) as enzyme labels in electrochemical immunoassays. (Yang S, et al., Electrochim. Acta 52, 200-205 (2006); Imabayashi S-i, et al., Electroanalysis 13, 408-412 (2001); Munteanu F D, et al., Anal. Chem. 70, 2596-2600 (1998); Glavan A C, et al., Anal. Chem. 86, 11999-12007 (2014); Rossier J S, et al., Lab Chip 1, 153-157 (2001); Kokkinos C, et al., TrAC, Trends Anal. Chem. 79, 88-105 (2016)) However, despite these efforts and commercial interests, progress in commercialization of electrochemical biosensors remains slow. (Wolfbeis O S, Angew. Chem., Int. Ed. 52, 9864-9865 (2013); Bahadir E B, et al., Anal. Biochem. 478, 107-120 (2015); Kissinger P T, Biosens. Bioelectron. 20, 2512-2516 (2005)). The reasons include the complexity of fabrication of sensing elements, the thermal and chemical instability of enzymes during fabrication, sterilization and storage, the reproducibility of enzyme activity and immobilization procedures, as well as challenges related to field-use of reagents, for example unstable hydrogen peroxide ($H_2O_2$). (Park S, et al., Anal. Chim. Acta 556, 46-57 (2006)) Thus, sensitive yet robust, renewable reagents and simple, reliable detection approaches are needed.

Using light to activate the chemical conversion of an analyte has been recently introduced in the field of electrochemical analysis. (Gao Z, et al., Nucleic Acids Res. 33, e123 (2005); Wang G-L, et al., Electrochem. Commun. 41, 47-50 (2014)) Chronoamperometry using disposable, screen-printed electrodes (SPE) yields a detection platform similar to that of glucose meters. In the case of photoelectrochemical sensors an analytical signal (photocurrent) is triggered by light and thus it can be cleanly distinguished from background by simply switching the light off. Advantageously, relatively stable reagents could be photoactivated to start a measurement. For example, an illuminated semiconductor can become a strong electron acceptor, capable to oxidize an organic compound and exchange electrons with an electrode. (Ma W G, et al., Anal. Chem. 87, 4844-4850 (2015))

Current methods of detection using photoactivation include either enzymes or semiconductors, the former being unstable, having a limited pH window for use, and needing non-renewable hydrogen peroxide, while the latter needing light in the ultraviolet (UV) region. There is a need for photoanalytical methods that use light in the infrared (IR) and the visible region.

BRIEF SUMMARY

One aspect of the present disclosure relates to an electrode including a conductive material, and a photosensitizer coupled to the conductive material, wherein the photosensitizer is a fluorinated phthalocyanine having a metal or a non-metal center. In an embodiment, the electrode may include a support particle having the photosensitizer disposed on surfaces thereof.

Another aspect of the disclosure relates to a method of detecting an analyte including illuminating an analyte solution which contacts an electrode comprising a conductive material having a photosensitizer coupled thereto to generate a reactive oxygen species, wherein the photosensitizer is a fluorinated pthalocyanine having a metal or a non-metal center, oxidizing an analyte present in the analyte solution with the reactive oxygen species to form an oxidized analyte; and detecting a current resulting from the reduction of the oxidized analyte. In an embodiment, the electrode may further comprise a support particle having the photosensitizer disposed on surfaces thereof.

Another aspect of the disclosure relates to a method of detecting a biomolecule including exposing an electrode having a first oligonucleotide disposed thereon to a photosensitizer coupled to a second oligonucleotide, wherein the first and second oligonucleotide are complimentary and wherein the photosensitizer is coupled to the electrode through complimentary coupling of the first and second oligonucelotides, illuminating the photosensitizer to generate a reactive oxygen species, and detecting a current resulting from reduction of the reactive oxygen species at the electrode.

DETAILED DESCRIPTION

The following detailed description of methods and apparatus for analyte detection using fluorinated phthalocyanines refers to the accompanying drawings that illustrate exemplary embodiments consistent with these methods and apparatus. Other embodiments are possible, and modifications may be made to the embodiments within the spirit and scope of the methods and systems presented herein. Therefore, the following detailed description is not meant to limit the devices described herein. Rather, the scope of these devices is defined by the appended claims.

As used herein, SPEIR$_{16}$PcM is a short hand notation to indicate that an R$_{16}$PcM, which is a functionalized phthalocyanine (Pc), is deposited on a screen printed electrode (SPE). As used herein, SPEIM$_x$O$_y$—R$_{16}$PcM is a short hand notation to indicate that as supported functionalized phthalocyanine, where an R$_{16}$PcM is supported on a support particle (M$_x$O$_y$), is deposited on an SPE. Generally, the notation SPEIcatalyst is a short hand notation for a catalyst, i.e., an element that either directly or indirectly catalyzes oxidation of an analyte, deposited on the SPE. Exemplary catalyst, as discussed herein, are photosensitizers, supported photosensitizers, enzymes, and the like.

Mechanism

Figure 1A:
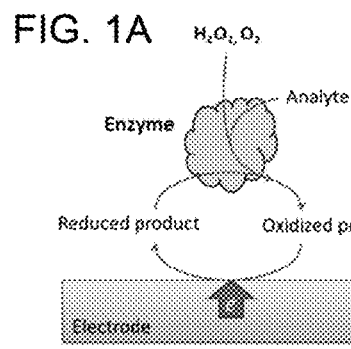
FIG. 1A is a schematic view of electrochemical detection of an analyte using an enzyme to catalyze the formation of an oxidized product.
Figure 1B:
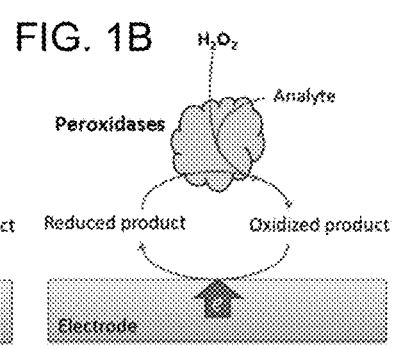
FIG. 1B is a schematic view of electrochemical detection of an analyte using a peroxidase to catalyze the formation of an oxidized product.
Figure 1C:
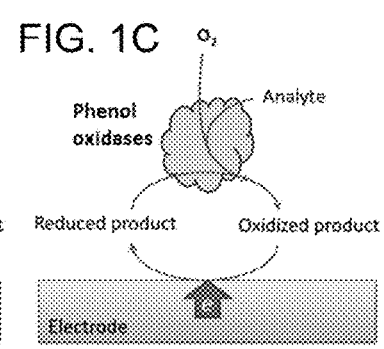
FIG. 1C is a schematic view electrochemical detection of an analyte using a phenol oxidase to catalyze the formation of an oxidized product.
Figure 1D:
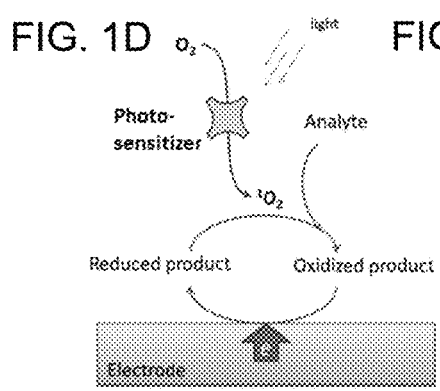
FIG. 1D is a schematic view of electrochemical detection of an analyte using a photosensitizer to catalyze the formation of an oxidized product.
Figure 1E:
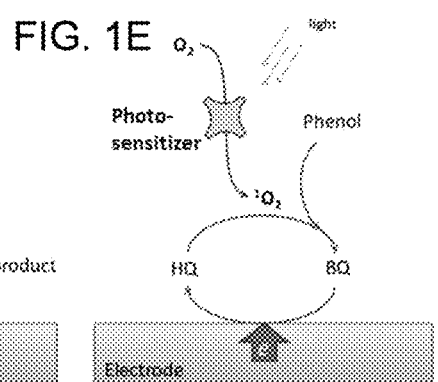
FIG. 1E is a schematic view of electrochemical detection of a phenol using a photosensitizer to catalyze the formation of a benzoquinone (BQ), which is an oxidized product of the phenol.

FIGS. 1A-1E illustrates conceptual parallel between the enzymatic and photosensitizer electrode mechanisms. Specifically, an oxidant, e.g., $H_2O_2$ or $O_2$, interacts with a catalyst, e.g., an enzyme, such as HRP, a peroxidase, or phenol oxidase, or a photosensitizer, yielding highly reactive intermediates, e.g., ferryl heme or $^1O_2$. These intermediates, in turn, rapidly oxidize an analyte, for example a phenol, such as a hydroquinone (HQ), or another appropriate electron donor in the case of HRP. (Rodríguez-López J N, et al., J. Am. Chem. Soc. 123, 11838-11847 (2001)) The intermediate, in the case of HRP, is the iron-oxo core, a classical electron plus proton abstractor, which oxidizes HQ to yield water and an oxidized product, e.g., a benzoquinone (BQ). The oxidized product is electrochemically reduced at a polarized electrode to regenerate the analyte, e.g. reduced product, thus completing a catalytic redox cycle (FIG. 1A-1C). The redox schemes dependency on electron donors, for example phenols, makes them useful for their quantification. (Yang S, et al., Electrochim. Acta 52, 200-205 (2006); Imabayashi S-i, et al., Electroanalysis 13, 408-412

(2001); Munteanu F D, et al., Anal. Chem. 70, 2596-2600 (1998)) The proposed enzymatic-like approach relies on catalyzed photo-transformation of dissolved, aerobic $^3O_2$ in the reactive, short-lived $^1O_2$. (FIGS. 1D-1E) In this schem, a photosensitizer catalyzes the formation of a reactive species, e.g., $^1O_2$ (singlet oxygen) from $^3O_2$ (triplet oxygen), and singlet oxygen reacts with the analyte to form an oxidized product which is then electrochemically reduced at a polarized electrode to regenerate the analyte, e.g., reduced product. Advantageously, this approach does not require $H_2O_2$, unlike some enzyme-based techniques.

Fluorine Containing Phthalocyanine

A fluorine containing phthalocyanine may be represented by Formula (I):

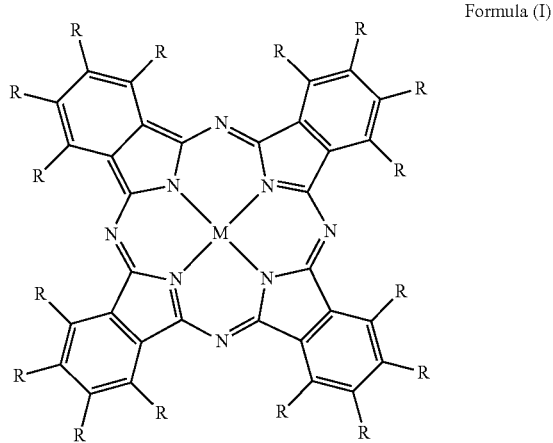

Formula (I)

The formula (I) may be written as $R_{16}PcM$, where Pc represents the phthalocyanine moiety. Each R can be independently selected from the group consisting of fluorine (F), a fluorocarbon containing from 1 to 18 carbon atoms, a fluorine-containing group, a non-fluorine containing group, and hydrogen (H). A non-fluorine containing group can include a functional group directly attached to the phthalocyanine macrocycle. Non-fluorine containing groups can include a carboxylic acid group, an aldehyde group, an amino group, a hydrazine group, an alkyne, alkene or a diene group, an azido group, an isocyanate group, an acyl halide, a hydroxide, a thiol, a nitro, a phosphate group, an amide, a halogen, such as chlorine, sulfonate, phenyl, or groups that are known in the art to act as substituents on aromatic compounds. At least one R includes a fluorine (F). In one embodiment, a fluorine containing phthalocyanine includes 8 R that are fluorine (F) and 8 R that are —$C(CF_3)_2F$. In one embodiment, a fluorine phthalocyanine includes 6 R that are fluorine (F), 3 R that are hydrogen (H), 1 R that is —O—($C_6H_4$)—COOH, and 6 R that are —$C(CF_3)_2F$.

M may be a metal, a non-metal, or at least one of a metal or non-metal in complex or covalently bonded to at least one axial ligand.

The fluorine containing phthalocyanine may be in the form of a salt. Pharmaceutically acceptable salts refers to the relatively non-toxic, inorganic and organic acid addition salts of the Pcs. These salts can be prepared in situ during the final isolation and purification of the photosensitizer(s), or by separately reacting a purified photosensitizer(s) in its free base form with a suitable organic or inorganic acid, and isolating the formed salt. Exemplary salts include the hydrobromide, hydrochloride, sulfate, bisulfate, phosphate, nitrate, acetate, pyruvate, valerate, oleate, palmitate, stearate, laurate, benzoate, lactate, phosphate, tosylate, citrate, maleate, fumarate, succinate, tartrate, naphthylate, mesylate, glucoheptonate, lactobionate, and laurylsulphonate salts, and the like. (See, for example, Berge et al. (1977) "Pharmaceutical Salts", J. Pharm. Sci. 66:1-19).

Fluorocarbons can include fluoroalkyl (i.e., perfluoroalkyl), fluoroalkylcylic, fluoroalkylbicyclic, and fluoroaryl. It will be obvious to those skilled in the art that other fluorocarbons having 1 to 18 carbon atoms can be used. The alkyl group of the fluoroalkyl may be methyl, ethyl, propyl, butyl, and cycloalkyl. The aryl group of the fluoraryl may be phenyl, benzyl, phenol, naphthyl, bi-aryl, and trityl. The alkylcyclic group of the fluoroalkylcyclic may be cyclopropyl, cyclobutyl, cyclopentyl and cyclohexyl. The alkylbicyclic group of the fluoroalkylbicyclic may be di-cyclobutyl, di cyclopentyl and di-cyclohexyl.

Fluorine-containing groups can include at least fluorine. Exemplary fluorine-containing groups can include fluoroheteroalkyl, fluoroheteroaryl, fluoroheterocyclic, and fluoroheterobicyclic. One or more of the substituent sites on the following groups can be substituted with fluorine. The heteroalkyl group may be methylamino, dimethylamino, ethylamino, diethylamino, propylamino, butylamino, alkoxy, alkoxyalkyl, alkylsulhydryl, haloalkyl and phosphoryl groups. The alkoxy may be methoxy, levulinyl, carboxy, ethoxy, and propoxy. The alkoxy group may be $O(CH_2)q$-R, where q=2-4 and R is —$NH_2$, $OCH_3$, or —$OCH_2CH_3$. The alkoxyalkyl group may be methoxyethyl, and ethoxyethyl. The haloalkyl group may be —$CF_3$, —$CBr_3$, —$CCl_3$ and —$Cl_3$. The heteroaryl group of the fluoroheteroaryl may be a trityl group or a carboxybenzyloxy group. The trityl group may be trityl-R, where R is $OC(CH_3)3$, $OCH_3$, or —$OCH_2CH_3$. The carboxybenzyloxy group may be selected from the group consisting of CO-aryl-R, where R is a halogen (—Cl, —F, —Br, I, alkyl or alkoxyalky (—$OC(CH_3)_3$, $OCH_3$, or —$OCH_2CH_3$).The heterocyclic group of the fluoroheterocyclic may be pyrimidinyl, pyrrolo, pyridinyl, oxazolinyl, aza-oxazolinyl, thio-oxazolinyl, thiophenyl, furyl, or imidazolyl. The heterobicyclic group of the fluoroheterobicyclic may be purinyl, steroyl, indoyl and quinolyl.

M can be a metal or non-metal. Exemplary metals can be $M^{2+}$ or M(II), such as $Zn^{2+}$, $Mg^{2+}$, $Fe^{2+}$, $Ru^{2+}$, $Pt^{2+}$, $M^{3+}$ or M(III), such as $Al^{3+}$, or $Sc^{3+}$, $M^{4+}$ or M(IV), such as $Zr^{4+}$ or $Ti^{4+}$, or $M^{5+}$ or M(V), such as $Sb^{5+}$. Exemplary non-metals can include P, Si, and H, where two H would be present on the phthalocyanine. The metal or non-metal can be in complex with, or covalently bound to at least one axial ligand. In some embodiments, the metal or non-metal can be in complex with or covalently bound to up to two axial ligands. The metal can be coordinated to a phthalocyanine moiety, for example, such as depicted in Formula I.

Each axial ligand can be any atom or group of atoms, similar or different that can coordinate M. It should be understood that an axial ligand may not be present in a certain M, and that more than one axial ligand may be present in a certain M. Each axial ligand may be independently selected, and may include H, alkylamino, alkylthio, alkoxy, alkylseleno, alkylsulfonyl, $C(S)NHC_6H_{11}O_5$, $OC(O)CH_3$, $OC(O)$, CS, CO, CSe, OH, O (oxo) and an alkyl group having from 1 to 12 carbon atoms, or $(CH_2)_nN((CH)_o(CH_3))_2$, wherein n is an integer from 1 to 12; and o is an integer from 1 to 11, or a pharmaceutically acceptable salt thereof (to achieve a neutral charge).

In some embodiments, M may be represented by $(G)_\alpha Y[(OSi(CH_3)_2(CH_2)_bN_c(R')_d(R'')_e)_fX_g]_p$, wherein a is 0 or 1, b is an integer from 2 to 12, c is 0 or 1, d is an integer from 0 to 3, e is an integer from 0 to 2, f is 1 or 2, g is 0 or 1, and p is 1 or 2. Y may be selected from Si, Al, Ga, Ge, and Sn. R' may be selected from H, $CH_3$, $C_2H_5$, $C_4H_9$, $C_4H_8NH$, $C_4H_8N$, $C_4H_8NCH_3$, $C_4H_8S$, $C_4H_8O$, $C_4H_8Se$, $OC(O)CH_3$, $OC(O)$, CS, CO, CSe, OH, $C_4H_8N(CH_2)_3CH_3$, $(CH_2)_2N(CH_3)_2$, an alkyl group having from 1 to 12 carbon atoms, and $(CH_2)_nN((CH_2)_o(CH_3))_2$, wherein n is an integer from 1 to 12; and o is an integer from 1 to 11. R" may be selected from H, $SO_2CH_3$, $(CH_2)_2N(CH_3)_2$, $(CH_2)_{11}CH_3$, $C(S)NHC_6H_{11}O_5$, an alkyl group having from 1 to 12 carbon atoms, and $(CH_2)_mN((CH_2)_o(CH_3))_2$, wherein n is an integer from 1 to 12; and o is an integer from 1 to 11. G may be selected from OH and $CH_3$. X may be selected from I—, F—, Cl—, or Br—.

M may include at least one metal, at least one non-metal, or a combination of a metal and a non-metal. Exemplary M include $AlOSi(CH_3)_2(CH_2)_3N(CH_3)_2$, $AlOSi(CH_3)_2(CH_2)_3N(CH_3)_3^+I^-$, $CH_3SiOSi(CH_3)_2(CH_2)_3N(CH_3)_2$, $HOSiOSi(CH_3)_2(CH_2)_3N(CH_3)_2$, $HOSiOSi(CH_3)_2(CH_2)_3N(CH_3)_3^+I^-$, $Si[OSi(CH_3)_2(CH_2)_3^+I^-]_2$, $Si[OSi(CH_3)_2(CH_2)_4NH_2]_2$, $Si[OSi(CH_3)_2(CH_2)_4NHSO_2CH_3]_2$, $HOSiOSi(CH_3)_2(CH_2)_4NHSO_2CH_3$, $HOSiOSi(CH_3)_2(CH_2)_3N(CH_2CH_3)(CH_2)_2N(CH_3)_2$, $Si[OSi(CH_3)_2(CH_2)_4 NHCSNHC_6H_{11}O_5]_2$, $Si[OSi(CH_3)_2(CH_2)_3N(CH_3)_2]_2$, $HOSiOSi(CH_3)_2(CH_2)_3OCOCH_3$, $HOSiOSi(CH_3)_2(CH_2)_3OH$, $Si[OSi(CH_3)_2(CH_2)_3 N(CH_2CH_3)(CH_2)_2N(CH_3)_2]_2$, $HOSiOSi(CH_3)_2(CH_2)_3NC_4H_8O$, $AlOSi(CH_3)_2(CH_2)_3N^+(CH_3)_2(CH_2)_{11}CH_3I^-$, $HOSiOSi(CH_3)_2(CH_2)_8N(CH_3)_2$, $Si[OSi(CH_3)_2(CH_2)_3NC_4H_8O]_2$, $HOSiOSi(CH_3)_2(CH_2)_3NC_4H_8S$, $HOSiOSi(CH_3)_2(CH_2)_3N(CH_2)_3(CH_3)_2$, $HOSiOSi(CH_3)_2(CH_2)_3NCS$, $HOSiOSi(CH_3)_2(CH_2)_3N[(CH_2)_3N(CH_3)_2]_2$, $HOSiOSi(CH_3)_2(CH_2)_3NC_4H_8NCH_3$, $Si[OSi(CH_3)_2(CH_2)_3NC_4H_8NCH_3]_2$, $HOSiOSi(CH_3)_2(CH_2)_3NC_4H_8N(CH_2)_3CH_3$, $Si[OSi(CH_3)_2(CH_2)_3NC_4H_8NH]_2$, or pharmaceutically acceptable salts thereof.

M can include $HOSiOSi(CH_3)_2(CH_2)_3N(CH_3)_2$, $HOSiOSi(CH_3)_2(CH_2)_3N(CH_2CH_3)(CH_2)_2N(CH_3)_2$, or $HOSiOSi(CH_3)_2(CH_2)_3N(CH_3)_2$, $HOSiOSi(CH_3)_2(CH_2)_3N(CH_2CH_3)(CH_2)_2N(CH_3)_2$. In one embodiment, M is $HOSiOSi(CH_3)_2(CH_2)_3N(CH_3)_2$.

M can be two protons, e.g. two H+.

Additional groups, such as anionic groups, may be linked to M to ensure electrical neutrality. Exemplary anionic groups can include halogens or oxo groups. For example, if M is $Si^{4+}$, two $Cl^-$ bonded to the Si, or an oxo group, or two hydroxyl groups ensures electrical neutrality.

In one embodiment, a fluorine containing phthalocyanine of formula (I) can be presented by the following chemical structure:

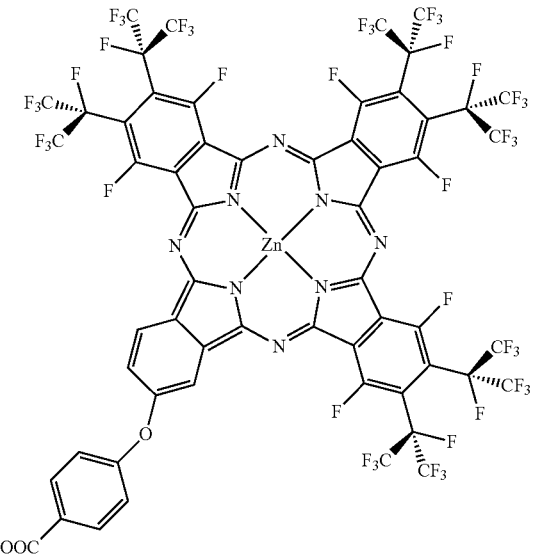

$F_{48}C_{25}O_3H_8PcZn$ was obtained as described in Carrión EN, et al., Inorg. Chem. 2017; 56: 7210-7216.

In one embodiment, a fluorine containing phthalocyanine can be represent by the following chemical formula (II):

$$F_xC_yPcM \qquad (II)$$

Where Pc is the phthalocyanine moiety and M represents any of the various embodiments of M discussed herein in regards formula (I). x ranges from 1 to 64 and y ranges from 0 to 64. In one embodiment, a fluorine containing phthalocyanine of formula (II) is represented by the following chemical structure:

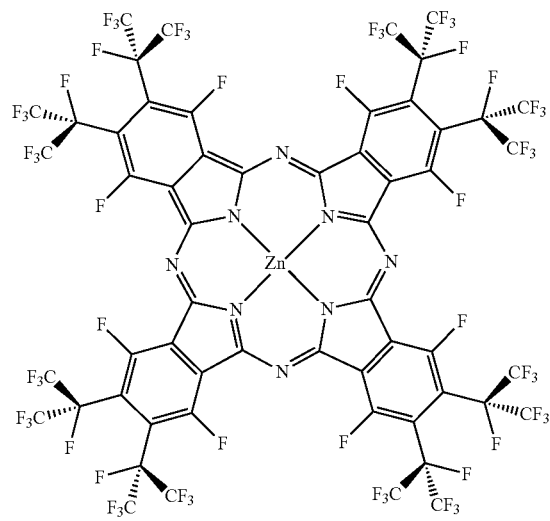

The above chemical structure is $F_{64}C_{24}PcZn$, which produces $^1O_2$ in a relatively high quantum yield. (Minnes R, et al., Photochem. Photobiol. 82, 593-599 (2006); Bench B A, et al., Angew. Chem., Int. Ed. 114, 773-776 (2002); Beveridge A C, et al., J. Phys. Chem. A 107, 5138-5143 (2003)) Unlike the protio phthalocyanine, $H_{16}PcZn$, $F_{64}C_{24}PcZn$ is stable in the presence of $^1O_2$ and other reactive species. (Gerdes R, et al., Dalton Trans., 1098-1100 (2009); Loas A, et al., Dalton Trans. 40, 5162-5165 (2011)) Unlike $F_{16}PcZn$, $F_{64}C_{24}PcZn$ has bulky i-$C_3F_7$ groups that effectively protect this molecule from aggregation and facilitate its dissolution in organic solvents such as ethanol. Site isolation is an important feature since aggregation, exhibited by the fluorinated $F_{16}PcZn$ diminishes the $^1O_2$ yield due to the shortening of the excited states lifetimes and/or inefficient intersystem crossing. In addition, the aromatic fluorines of $F_{16}PcZn$ are subject to nucleophilic attack, including from some ROS species thus rendering this molecule less viable for $^1O_2$ photocatalysis. (Leznoff C C, et al., Chem. Commun. (Cambridge, U.K.), 338-339 (2004)) In contrast, attempts to detect nucleophilic substitutions at the 8 α C—F positions of $F_{64}C_{24}PcZn$ have not succeeded thus far, due at least in part to the steric hindrance afforded by the eight adjacent β bulky i-$C_3F_7$ groups. Thus, $F_{64}C_{24}PcZn$ can have sustained $^1O_2$ production.

Figure 3:
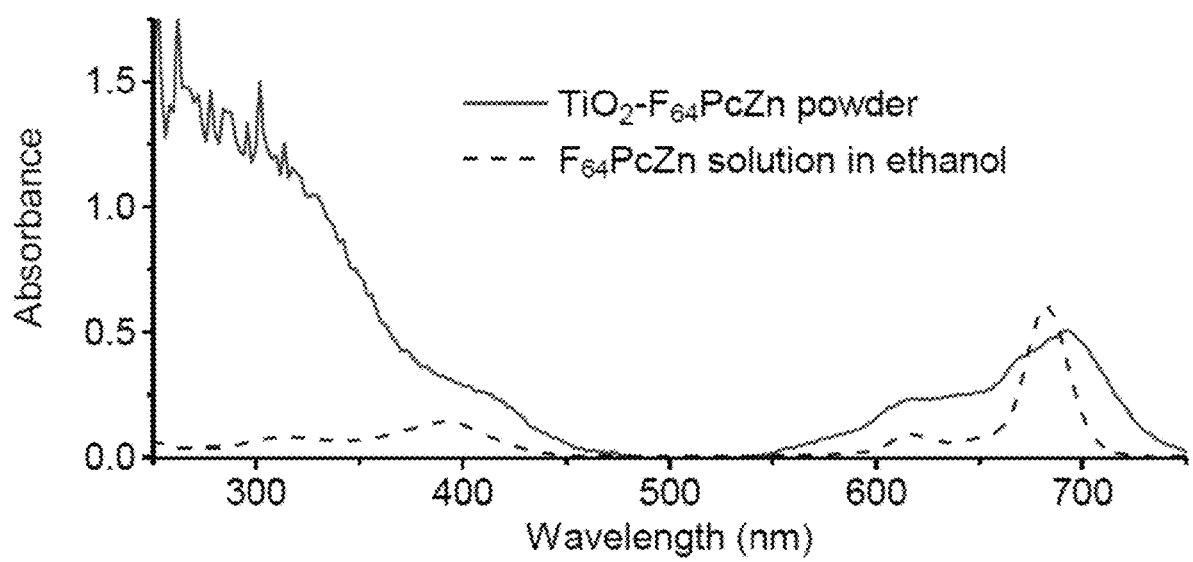
FIG. 3 is a diffuse reflectance UV-Vis absorption spectrum of $TiO_2$—F64C24PcZn in comparison to a UV-V is absorption spectrum of 10 µg/ml $F_{64}C_{24}PcZn$ in ethanol.

In summary, the $F_{64}Pc$ scaffold affords chemically and thermally stable yet photoreactive complexes features that led to its choice. (Gerdes R, et al., Dalton Trans., 1098-1100 (2009); Loas A, et al., Dalton Trans. 40, 5162-5165 (2011)) Furthermore, the need for solid-state catalysts using the $F_{64}Pc$ scaffold led to the exploration of its support on materials, including $TiO_2$. (Gorun S M, et al., U.S. Pat. No. 9,260,630) $F_{64}C_{24}PcZn$ was deposited in 0.5 to 3 wt % on $TiO_2$, a carrier matrix with a 21 nm primary particle size and 35-65 $m^2$ $g^{-1}$ surface area. The diffuse reflectance UV-Vis spectrum of the hybrid material, $TiO_2$—$F_{64}C_{24}PcZn$, exhibited the characteristic Q-band of phthalocyanines in the 600-700 nm range and absorbance below 400 nm, attributed to a combination of Soret bands and the intrinsic absorbance of $TiO_2$ (FIG. 3). (Moons H, et al., Dalton Trans. 43, 14942-14948 (2014); Marin M L, et al., Chem. Rev. 112, 1710-1750 (2012)) The Q-band is relatively broad, but centered at the same position as that of $F_{64}C_{24}PcZn$ in solution. The 655 nm wavelength of a common diode laser pointer essentially matches the Q band of $TiO_2$—$F_{64}C_{24}PcZn$, a material that was shown to produce $^1O_2$ using visible and filtered red light. (see, for example, U.S. Pat. No. 9,260,630) Thus, a photoelectrochemical response of $F_{64}C_{24}PcZn$-$TiO_2$ deposited on screen printed electrodes (SPE), abbreviated SPEl$TiO_2$—$F_{64}C_{24}PcZn$ should be absent in the absence of red-light exposure, but could be measurable under illumination. Importantly, dark measurements automatically reveal the actual baseline position, leading to an efficient and straightforward way for baseline correction even in the presence of analytes.

Support Particles

The application of fluorine containing phthalocyanine onto support particles (e.g., metal oxides and/or other oxides) results in the formation of a supported photosensitizer. The supported photosensitizer may by represented by the short hand notation of 'support particle—$R_{16}PcM$', or a similar variant as used herein. In some embodiments, the supported photosensitizer may exhibit bonds not present within the support particle or the fluorine containing phthalocyanine alone. For example, the supported photosensitizer may exhibit the reactivity of the fluorine containing phthalocyanine and that of the support particle, if any.

A variety of phases of oxides can be used, in various degrees of dispersion and particle size. For example, when the oxide includes $TiO_2$, the support particles can contain $TiO_2$ in large extent in an anatase crystalline form. For example, about 95% or more (by volume) of the titanium oxide particles can be in the anatase crystalline form.

The support particles can be in the form of microparticles and/or nanoparticles. As such, the support particles can have a size of about 10 nm to about 100 μm. In one embodiment, the support particles are nanoparticles having an average size of about 10 nm to about 150 nm, or about 10 nm to about 100 nm.

Without wishing to be bound by any particular theory, it is believed that the presence of carbon-fluorine bonds in the phthalocyanine allows for van der Waals interaction between the halogenated phthalocyanine and the support particles (particularly when oxygen atoms are present, such as in oxides). In addition, it is also believed that an oxygen atom of the oxide support particles, which may have a slightly negative charge, interacts with the metal or non-metal M of the fluorine containing phthalocyanine. Furthermore, when the fluorine containing phthalocyanine contains 2 protons instead of a central metal or non-metal, hydrogen bonding may link the protons to the surface of the supporting particle.

The support particles are, in one embodiment, formed from oxides, including but not limited to, silicon oxides (e.g., $SiO_2$), metal oxides (e.g., titanium oxides (e.g., $TiO_2$), aluminum oxide (e.g., $Al_2O_3$), zinc oxides (e.g., ZnO), iron oxides (e.g., FeO, $Fe_2O_3$, $Fe_3O_4$), zirconium oxides (e.g., $ZrO_2$), lanthanides oxides, etc.), or mixtures thereof. Other inert materials may be included in the support particles, either in addition to an oxide or in the alternative of an oxide. For example, the support particles may include carbon black, sulfides, carbonates, etc.

In one embodiment, the support particles include titanium oxide, which results in a combined activity of the titanium oxide and the fluorine containing phthalocyanine. Conversely, the use of an inert material in the support particles, such as silicon dioxide, can result in a composition in which only the phthalocyanine plays a photocatalytic role. Thus, the superior photocatalytic properties of the fluorine containing phthalocyanine manifest themselves in the presence of supports, either inert or reactive.

The supported photosensitizers can be manufactured by loading support particle with the fluorine containing phthalocyanine. In some embodiments, support particles are added to a solution containing a solvent and the fluorine containing phthalocyanine and subsequently the solvent is evaporated to yield the supported photosensitizer. In certain embodiments, the support particles can be loaded with the fluorine containing phthalocyanine at a concentration of about 0.1% to about 10% by weight of the total weight of the supported photosensitizer.

Electrode and Electrochemical Cell

Figure 2A:
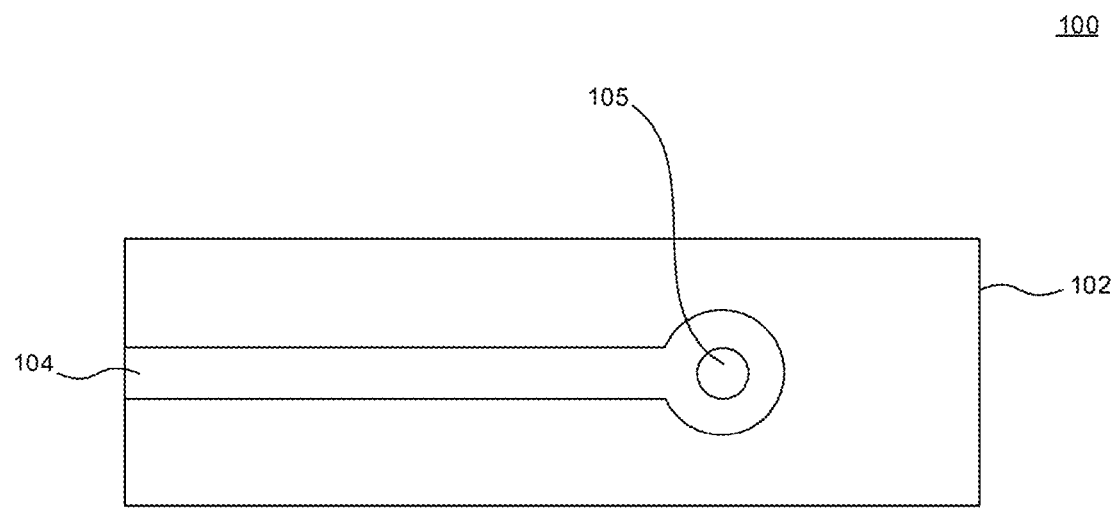
FIG. 2A is a schematic view of an electrode in accordance with an embodiment of the disclosure.

FIG. 2A illustrates a schematic view of an electrode 100 in accordance with an embodiment of the disclosure. The electrode 100 includes a substrate 102. The substrate 102 can be an electrically insulating material. Overlying or partially embedded in the substrate 102 can be a conductive material 104. The conductive material 104 can be any suitable conductive materials, such as carbon, gold, platinum, silver, copper and the like. A photosensitizer 105, such as a fluorine containing phthalocyanine, which can be unsupported or supported on a support particle, contacts the conductive material 104. The electrode 100 can be used in an electrochemical cell as discussed herein.

Figure 2B:
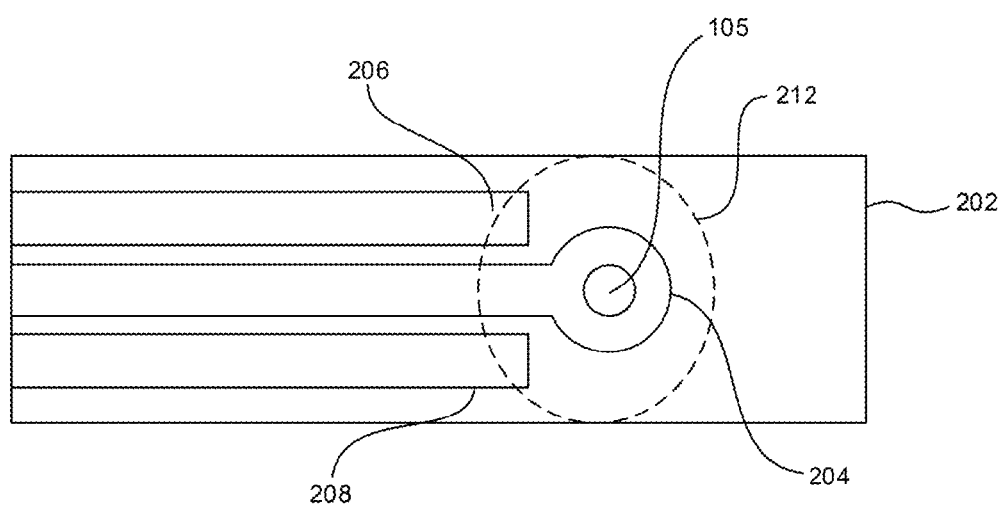
FIG. 2B is a schematic view of an electrode in accordance with an embodiment of the disclosure.

FIG. 2B illustrates a schematic view of an electrode 200 in accordance with an embodiment of the disclosure. The electrode 200 includes a substrate 202. The substrate 202 can be an electrically insulating material. Overlying or at least partially embedded in the substrate 202 can be a first conductive material 204, a second conductive material 206, and a third conductive material 208. The conductive materials 204, 206, 208 are electrically insulated from each other by the substrate 202 or by another electrically insulating material. One of the conductive materials can be working electrode, another of the conductive materials can be a counter electrode, and another of the conductive materials can be a reference electrode. Exemplary conductive materials include graphite, carbon paste, and the like.

The photosensitizer 105 can be deposited on at least one of the conductive materials 204, 206, 208. Optionally, the photosensitizer can be disposed on all of the conductive materials 204, 206, 208.

Figure 2C:
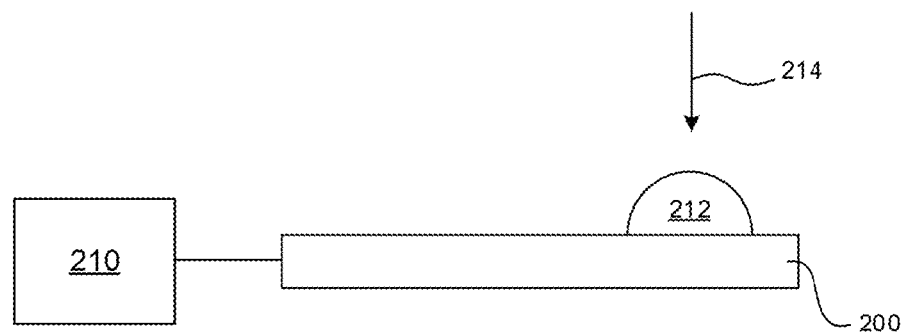
FIG. 2C is a schematic view of the electrode of FIG. 2B having a drop containing an analyte disposed thereon and under illumination of a light source in accordance with an embodiment of the disclosure.

FIG. 2C illustrates operation of the electrode 200 in accordance with an embodiment of the disclosure. In operation, the electrode 200 may be connected to a voltage source 210 to provide a potential difference between the working electrode and the counter electrode. A drop 212 of an analyte solution can be deposited such that it contacts all of the conductive materials 204, 206, 208. A voltage may be applied from the voltage source to determine a baseline current between the working electrode and the counter electrode. A light source 214 may then be turned on to illuminate the photosensitizer 105. The photosensitizer 105 catalyzes the formation of reactive species, such as singlet oxygen ($^1O_2$). The singlet oxygen oxidizes the analyte in the drop 212 at the working electrode. The oxidized analyte is then reduced at the working electrode. This oxidation/reduction process results in a photo-induced current which can be current monitored by an ammeter or another device that measures current. The electrode 200 is akin to a glucose monitoring device in the sense that a drop of blood is placed on a test strip that includes working and counter electrodes to measure a level of glucose in the blood.

Figure 2D:
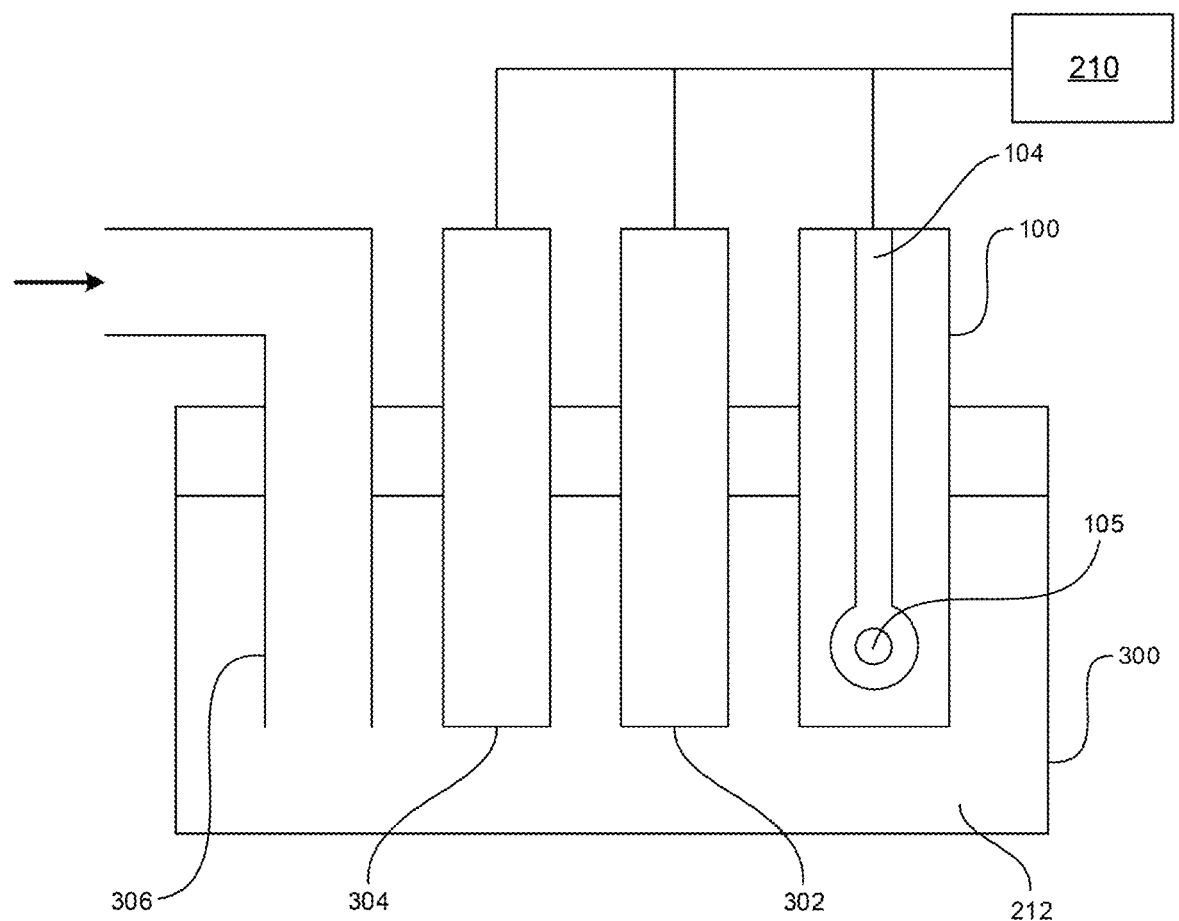
FIG. 2D is a schematic view of an electrochemical cell including the electrode of FIG. 2A in accordance with an embodiment of the disclosure.

FIG. 2D illustrates an electrochemical cell 300 in accordance with an embodiment of the disclosure. In one embodiment, the electrochemical cell 300 includes the electrode 100, a counter electrode 302, and a reference electrode 304. The electrodes 100, 302, and 304 are immersed in an analyte solution. In an embodiment, the electrochemical can be open to atmosphere, or alternatively, can be sealed as illustrated in FIG. 2D. The sealed cell 300 can include a conduit 306 for providing an atmosphere to the interior of the cell 300 which includes the analyte solution. The operation of the cell 300 is similar to that described for electrode 200. The voltage source 210 is connected to the electrode 100 and counter electrode 302 to provide a potential difference between these electrodes. A baseline current can be measured prior to turn on the light source 214 (not illustrated in FIG. 2D). In the sealed cell 300, the conduit 306 provides air or oxygen which is necessary to generate the reactive species. The light source 214 is used to illuminate the electrode 100 to activate the photosensitizer 105 to catalyze the formation a reactive species, such as singlet oxygen, which oxidizes the analyte. The oxidized analyte is reduced at the working electrode 104. The oxidation and reduction of the analyte results in a photo-induced current that can be monitored. Alternatively, the electrode 200 could also be used in the electrochemical 300 (not illustrated in FIG. 2D). In such an embodiment one conductive material (which contacts the photosensitizer 105) of the electrode 200 would be electrically connected to the voltage source 210.

The conduit 306 can be used to provide other gases, such as an inert gas, e.g., nitrogen ($N_2$). When an inert gas is provided, the formation of a reactive species by the photosensitizer 105 generally is limited or does not occur due the absence of oxygen which is the source needed to generate the reactive species.

The analyte solution includes an analyte. The analyte may be a phenol, such as hydroquinone, amoxicillin, cefadroxil and other antibiotics containing a phenolic group, catechol, bisphenol A, 2-chlorophenol, 3-chlorophenol, 4-chlorophenol, polychlorinated phenols, 2-nitrophenol, 3-nitrophenol, 4-nitrophenol, aniline, 2-aminophenol, 3-aminophenol, 4-aminophenol, 2-amino-4-chlorophenol, 4-cyanophenol, 4-methylphenol, and 3,3',5,5'-tetramethylbenzidine. The analyte can be formed in another appropriate reaction that is used to detect a non-phenolic compound. For example, alkaline phosphatase transforms 4-nitrophenyl phosphate into 4-nitrophenol which is then detected photoelectrochemically using methods described herein while 4-nitrophenyl phosphate is not detected because its phenolic group is blocked by the phosphate. As such, the method described herein can be used to detect alkaline phosphatase, for example in immunoassays, by detecting an analyte that it produces, e.g., 4-nitrophenol. Alkaline phosphatase is widely used as a label for antibodies.

The analyte solution can include the analyte disposed in a buffer solution. The buffer solution can be an aqueous based solution, and may include an organic salt and/or an inorganic salt, and/or a phosphate-containing compound to maintain a pH of about 7 to about 14. In some embodiments, the pH ranges from about 9 to about 13. In one embodiment, the pH ranges from about 10 to about 12. Exemplary organic or inorganic salts can include potassium chloride (KCl), sodium chloride (NaCl), acetate, citrate, tris (2-Amino-2-(hydroxymethyl)propane-1,3-diol), glycine, borate. Exemplary phosphate-containing compounds can include disodium hydrogen phosphate. The analyte solution can include organic components, for example, which can be considered contaminants when detecting an analyte in an aqueous environment. The organic materials may be included in amount of about 0.1 vol % to about 10 vol %, based on the total volume of the buffer solution. In some embodiments, the organic components can be included in amounts ranging from about 1 vol % to 5 vol %, or from about 5 vol % to about 10 vol %. Exemplary organic components can include ethanol, acetone, acetonitrile, acetic acid, surfactants, and combinations thereof.

Figure 8A:
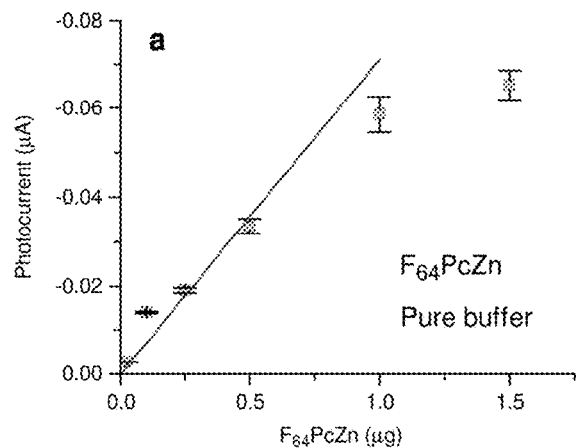
FIG. 8A a plot of photocurrent dependence on the concentration $F_{64}C_{24}PcZn$ in the absence of an analyte in accordance with some embodiments of the disclosure.
Figure 8B:
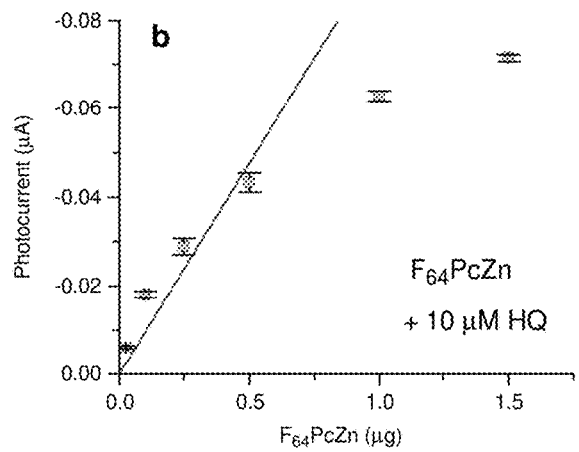
FIG. 8B is a plot of photocurrent dependence on the concentration $F_{64}C_{24}PcZn$ in the presence of an analyte in accordance with some embodiments of the disclosure.
Figure 8C:
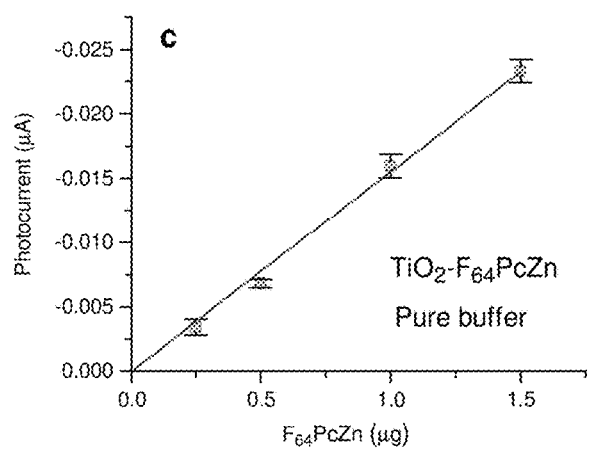
FIG. 8C a plot of photocurrent dependence on the concentration $TiO_2$—F64C24PcZn in the absence of an analyte in accordance with some embodiments of the disclosure.
Figure 8D:
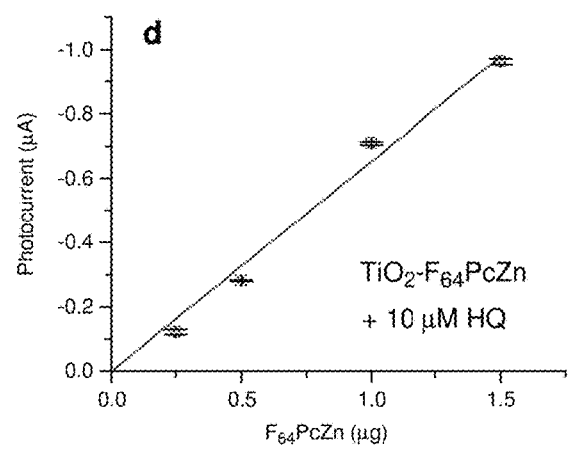
FIG. 8D is a plot of photocurrent dependence on the concentration $TiO_2$—F64C24PcZn in the presence of an analyte in accordance with some embodiments of the disclosure.

In an alternative embodiment, the photosensitizers can be used as a label for biomolecules. As illustrated in FIGS. 8A, 8C the photocurrent is proportional to the amount of the photosensitizer either being directly deposited on the working electrode or dispersed on carrier particles, while the photocurrent is negligible in the absence of the photosensitizer (FIGS. 5A, 5B). The possibility to employ photosensitizers coupled to biomolecules was illustrated by a model detection scheme (not illustrated in FIGS. 2A-2D) using complementary oligonucleotides. A first oligonucleotide is attached to a conductive material of an electrode (e.g., a working electrode) and the second oligonucleotide is coupled to a photosensitizer generating singlet oxygen. Next, a solution containing the second oligonucleotide coupled to the photosensitizer is placed on the surface of the conductive material and left for a period of time, e.g., up to about 2 hours, for a recognition reaction between the first and second oligonucleotides. Upon excitation with light, the photosensitizer catalyzes the formation of a reactive oxygen species, and it is the reactive oxygen species that is reduced at the electrode to produce a photocurrent. The photocurrent indicates the presence of the second oligonucleotide which has attached to the complimentary first nucleotide present at the electrode. If the second oligonucleotide was not localized to the electrode by attachment to the first oligonucleotide, detection of photocurrent using the photosensitizer is weak or not possible.

The use of enzymes for chemical analysis is reaching maturity. Photosensitizers generating $^1O_2$ have been explored and exploited in the fields of organic synthesis, medical photodynamic therapy and others, but not yet in the field of chemical sensors. (Weijer R, et al., J. Photochem. Photobiol., C 23, 103-131 (2015); Ghogare A A, et al., Chem. Rev. 116, 9994-10034 (2016)) The proposed analogy between the photo-catalytic and enzymatic detection schemes, FIG. 1, might be the basis for new directions of exploration of $^1O_2$-generating photo-catalytic materials as chemical sensors.

The high reactivity of $^1O_2$ and its ROS daughters, however, limits the use of photocatalytic materials due to photosensitizers degradation and thus low turnover numbers. (Ghogare A A, et al., Chem. Rev. 116, 9994-10034 (2016)) This is not surprising considering that C—H bonds containing photosensitizers are being attacked by the $^1O_2$ and ROS they produce. Moreover, the oxidation of analytes may also generate reactive species, including radicals, an additional source of sensor degradation.

The photosensitizer photo-degradation is mitigated by using a fully fluorinated Zn phthalocyanine complex, $F_{64}C_{24}PcZn$, an efficient yet stable $^1O_2$ generator in solution and in the solid state. (Gerdes R, et al., Dalton Trans., 1098-1100 (2009); Loas A, et al., Dalton Trans. 40, 5162-5165 (2011)) The manufacture of electrodes containing $F_{64}C_{24}PcZn$ revealed that robust, ROS and redox processes inactivation-resistant sensors can be produced. The bulky $F_{64}C_{24}Pc$ organic scaffold, complexed by a closed-shell metal ion like $Zn^{2+}$ precludes aggregation which can cause deactivation of the photosensitizer, exhibits reversible electron addition and resistance to radical, electrophilic and nucleophilic attacks. (Loas A, et al., Dalton Trans. 40, 5162-5165 (2011))

Electronic transfers to/from the sensor are thus feasible while the interactions of electrodes with analyte species occur without baseline interference. The latter process is possible since only light switching triggers the appearance of analyte products, the dark photocurrents being obtained from a chemical composition-invariable environment. Compared with enzymatic detection, significantly higher signal-to-noise ratios are generally observed, while selectivity based on the type of chemical oxidation, represents an additional bonus.

The proposed strategy compares favorably with HRP-based detection for a series of phenols, including pharmaceuticals bearing the phenol functionality. The analyte chosen as an example, amoxicillin, is the most used antibiotic, but also contaminates hospital trash and urban wastewaters and is therefore a marker in environmental management and pollution control. (Versporten A, et al., J. Antimicrob. Chemother. 66, vi13-vi23 (2011); Richardson S D, et al., Anal. Chem. 88, 546-582 (2016)) Amoxicillin and other phenols' selective detection suggests that the direct, ene reactivity of $^1O_2$ operates, as noted previously for phenol and dominates the selective sensing process. (Li C, et al., J. Phys. Chem. A 104, 5998-6002 (2000)) The shuttle of electrons between a site of $^1O_2$ production/reactivity and an electrode occurs for both $SPEITiO_2$—$F_{64}C_{24}PcZn$ and $SPEIF_{64}C_{24}PcZn$ electrodes that detect redox-active products, but the nano-dispersed $TiO_2$—$F_{64}C_{24}PcZn$ is more effective due to its high surface area and spatial distribution of $F_{64}C_{24}PcZn$ in the large bulk volume of the support. The sensing efficiency can be understood and tuned using classical catalysis principles.

Catalyst robustness, structural modifications favoring single-site isolation, loading degree, light intensity, dark baseline corrections, surface area and particle sizes of supports, etc., could be used to optimize performance. The kinetics of the $^1O_2$ mediated oxidation of an analyte could be further tuned by modifying the reaction conditions such as temperature and pH, as shown for phenols. The large variation of pH, an important parameter for optimizing sensors' sensitivity and selectivity, is unavailable in the enzymatic detection scheme.

Molecular photosensitizers could also be used as labels for biorecognition/affinity assays even if somewhat unstable, such as Pheophorbide A since the signal decay takes minutes while detection occur seconds after the catalyst is photoactivated. Life-time of $^1O_2$ suggests a diffusion distance of about 200 nm and thus the label itself does not need to contact an electrode to produce an analytical response. Application of this detection scheme, however, is rather limited by the single-use type of the sensors due to the response decay in a sequence of repeatable measurements. While electroactive compounds (e.g. ferrocene) could still be useful as labels in case of short stranded DNA, they cannot provide an efficient and generic solution for affinity sensors due to the rapid charge transfer rate—distance decay that result in poor signals for biomolecules, whose typical size is a few nanometers (Khoshtariya D E, et al., J. Am. Chem. Soc. 125, 7704-7714 (2003); Schoukroun-Barnes L R, et al., Langmuir 31, 6563-6569 (2015)).

As noted above, the redox cycling afforded by HQ results in remedial signal amplifications due to electrons shuttling between the electrode and the $^1O_2$ producing photo-catalyst, suggesting opportunities for electrochemical microarrays and washing-free immunosensors. (Dutta G, et al., Anal. Chem. 86, 4589-4595 (2014)) In conclusion, robust, perfluorinated molecular photosensitizers, resistant chemically yet reactive, have been shown as proof-of-principle efficient enzymes mimics for electrochemical (bio)sensing applications, while favorably enhancing the useful feature of the enzymatic detection mechanism, namely the catalytic formation of an easily detectable product and redox cycling. A Type II photosensitizer generates photocurrents using air oxygen without the need to add any supplementary reagents.

The perfluorination of the sensitizer insures its functional resilience as well as long term stability vis-à-vis the reactive oxygen and other species it may generate. The use of catalytic photosensitizers instead of enzymes for analytical sensing offers several advantages, including: chemical and thermal stability; on-off control of sensing by on-off light switching; facile dark baseline monitoring and adjustments; invariable structural and reactivity properties of photocatalytic, well-defined metal complexes; comparative simplicity and low preparation price; facile chemical modification and functionalization, attachment to biomolecules and surfaces.

The bioinspired molecules, subject to chemical modifications, coupled to biomolecules may allow conjugates to function in the same way as fluorescent dye- and enzyme-labeled (e.g. HRP-labeled) reagents, but affording an additional, on-demand reactivity controlled by simply switching the light. An enhanced degree of flexibility in the design of biorecognition elements and the functionalization of sensor surfaces is envisioned. The present example of a bioinspired strategy of replacing an enzyme with synthetic components for analytical purposes could be useful for developing applications ranging from chemistry to biology and environmental monitoring.

EXAMPLES

Although the examples below are directed to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

Synthesis of Perfluorophthalocyanine Zn ($F_{64}C_{24}PcZn$)

Perfluorophthalocyanine Zn ($F_{64}C_{24}PcZn$) used in the examples herein was synthesized and characterized as described earlier. (Bench B A, et al. Angew. Chem., Int. Ed. 114, 773-776 (2002)) Briefly, perfluoro-(4,5-bis-isopropyl) phthalonitrile was prepared from perfluorophthalonitrile and perfluoropropene and reacted with Zn acetate. The obtained product was purified by chromatographically and recrystalized twice from acetone. The $^{19}F$ NMR and UV-Vis spectra were identical with the literature data.

Synthesis of $TiO_2$—$F_{64}C_{24}PcZn$, $SiO_2$—$F_{64}C_{24}PcZn$ $TiO_2$—HRP

Titanium dioxide ($TiO_2$) (Aeroxide® P25) and silicon dioxide ($SiO_2$) (AEROSIL® OX 50) were obtained from Evonik Inorganic Materials (USA).

Prior to impregnation with $F_{64}C_{24}PcZn$, $SiO_2$ and $TiO_2$ were dried at 100° C. for 2 hours. After dissolving $F_{64}C_{24}PcZn$ in about 10 ml of absolute ethanol either $SiO_2$ or $TiO_2$ were added to this solution. The ethanol was evaporated under vacuum and the impregnated $SiO_2$ or $TiO_2$ were dried at 100° C. for 6 hours. Loading amounts of $F_{64}C_{24}PcZn$ were confirmed spectrophotometrically by back extracting (Soxhlet extraction) $F_{64}C_{24}PcZn$ from the impregnated materials with acetone until the oxide appeared white and no $F_{64}C_{24}PcZn$ was observed via diffuse reflectance UV-Vis spectroscopy. $TiO_2$ or $SiO_2$ containing about 3 wt % $F_{64}C_{24}PcZn$ was used in all experiments, if not mentioned otherwise.

For the impregnation of $TiO_2$ with HRP, $TiO_2$ was suspended in a solution of about 0.125 millimolar (mM) HRP in about 10 mM (4-(2-hydroxyethyl)-1-piperazineethanesulfonic acid (HEPES) buffer (pH=7) and the mixture was agitated overnight on a rotatory shaker. The suspension was centrifuged and the pellet washed three times with 10 mM HEPES buffer (pH=7) and dried at room temperature for about 8 hours. The resulting powder was refrigerated prior to use. A loading of about 1.06 µmol $g^{-1}$ (about 4.6 wt %) was calculated from the concentration of HRP in the supernatant collected after adsorption. The supernatants of washing solutions did not contain any noticeable amount of HRP.

Oligonucleotides

Oligonucleotides were obtained from Eurogentec (Belgium). Their structures and purity were confirmed by mass-spectrometry. Sequences of the oligonucleotides were as follows: probe 1 (complementary): 5'-HS—$(CH_2)_6$-tagct-tatcagactgatgttga-3; probe 2 (non-complementary): 5'-HS—$(CH_2)_6$-tagcttatgtgtaccctgtcag-3'; oligonucleotide labeled by Pheophorbide A: 5'-Pheo-tcaacatcagtctga-3'.

Analytes and Other Materials

Amoxicillin of 99.4% purity was obtained from TCI Europe (Belgium), HQ of 99.9% purity was purchased from Acros Organics (Belgium). Other phenolic compounds were 98% purity or better and obtained from different suppliers. L-Ascorbic acid of 99.5% purity was obtained from Sigma-Aldrich (Belgium). Ultrapure water was used for all experiments.

Buffer solutions used in the Examples were aqueous solutions (ultrapure water) including about 0.1 M KCl and about 0.01 to 0.02 M $KH_2PO_4$ to maintain a pH of about 7. For experiments with a higher pH, such as pH of about 12, the same buffer solution is used, except the pH is adjusted higher by addition of KOH. A 'blank buffer solution' is the buffer solution in the absence of an analyte. An 'analyte solution' as discussed in the Examples is an analyte in a buffer solution.

Electrodes

Screen-printed carbon electrodes (SPE) model DRP-110 were purchased from DropSens (Asturias, Spain). Graphite disk electrodes were made of spectroscopic pure graphite rods (SPI supplies, West Chester, Pa., USA) by insulating its sidewall by an epoxy resin. Gold disk electrodes MF-2014 were purchased from BASi (West Lafayette, Ind., USA).

SPEI $F_{64}C_{24}PcZn$ was obtained by depositing a 5 µl drop of 0.3 mg/ml of $F_{64}C_{24}PcZn$ solution in ethanol on an SPE and letting the solvent evaporate. SPEI$TiO_2$—$F_{64}C_{24}PcZn$ were manufactured by adding a 5 µl drop of an aqueous suspension containing 10 mg/ml $TiO_2$—$F_{64}C_{24}PcZn$ on the working electrode surface of SPEs and allowing the water to evaporate completely at room temperature.

Equipment

The electrochemical measurements were conducted using a µAutolab III (Metrohm-Autolab BV) instrument. Data for calibration curves were obtained using PalmSens3 (PalmSens BV) instrument. UV-Vis-diffuse reflectance (UV-Vis-DR) spectra were measured using an Evolution 500 double-beam spectrophotometer equipped with RSA-UC-40 DR-UV integrated sphere (Thermo Electron Corporation, USA) or a Cary 5000 instrument (Agilent, USA). A diode laser pointer operating at 655 nm (Roithner Lasertechnik, Austria) was adjustable up to about 30 mW power using a light power meter. A power supply was programmed to switch on and off the light beam at given time intervals.

Electrochemical Measurements

Measurements with SPE (e.g., as illustrated in FIG. 2C) were performed in a drops of 80 µl volume. A saturated calomel electrode (SCE, Radiometer, Denmark) was used as an external reference electrode whenever necessary. The quasi-reference electrode of SPEs had the potential of +0.04 V versus SCE in the measuring buffer (e.g., blank buffer solution). All potentials in the examples are given versus SCE.

To study the effect of oxygen, a tightly closed three electrode cell (e.g., as illustrated in FIG. 2D) was used with SPE, SCE, and a glassy carbon rod as the working, reference and counter electrodes, respectively. The beam of the diode laser was directed to the working electrode surface through the glass wall of the cell. Some, constant power loss was noted due to the glass wall absorption. When ethanol was used in the analyte solution performed in the electrochemical cell under air (not insulated, no nitrogen purging) to avoid effects related to possible dependence of the SPE reference electrode on the composition of the measuring buffer and simplify interpretation of the results.

Example 1

Absorption Characteristics of $TiO_2$—$F_{64}C_{24}PcZn$

The diffuse reflectance UV-Vis absorption spectrum of $TiO_2$—$F_{64}C_{24}PcZn$ powder was measured and is shown in FIG. 3 (solid line). The spectrum exhibited the characteristic Q-band of phthalocyanines in the 600-700 nm range and absorbance below 400 nm was attributed to a combination of Soret bands and the intrinsic absorbance of $TiO_2$. (Moons H, et al., Dalton Trans. 43, 14942-14948 (2014); Marin M L, et al., Chem. Rev. 112, 1710-1750 (2012)) The Q-band is relatively broad, but centered at the same position as that of a 10 µg/ml solution of $F_{64}C_{24}PcZn$ in ethanol (dotted line in FIG. 3). The 655 nm wavelength of a common diode laser pointer (visible spectrum, red light) overlaps the Q band of $TiO_2$—$F_{64}C_{24}PcZn$, a material that was shown to produce $^1O_2$ using visible and filtered red light. (see, for example, U.S. Pat. No. 9,260,630)

Example 2

Oxygen and Electron-Based Photocatalysis

Figure 4A:
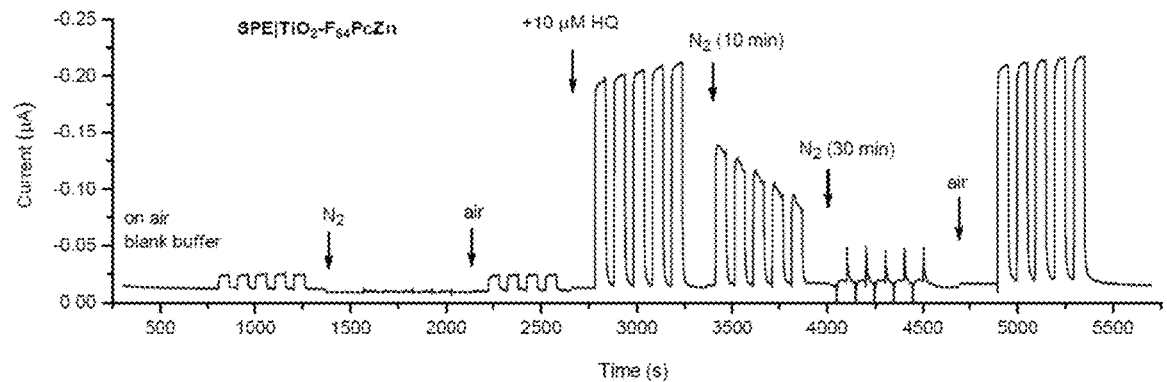
FIG. 4A is an amperometric response of SPEITiO$_2$—F64C24PcZn in a blank buffer and 10 µM HQ.
Figure 4B:
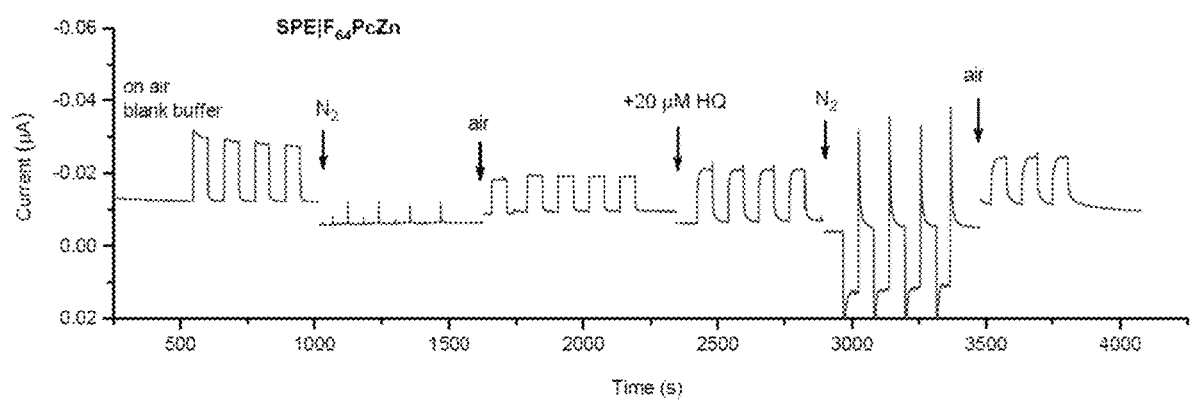
FIG. 4B is an amperometric response of $F_{64}C_{24}PcZn$, SPEI $F_{64}C_{24}PcZn$ in a blank buffer and 20 µM HQ.

The role of $O_2$ for substrate detection using the photodynamic effect observed for $F_{64}C_{24}PcZn$ was confirmed by comparing photocurrents obtained in an air-saturated buffer with those obtained under an inert $N_2$ atmosphere in an electrochemical cell using hydroquinone as an analyte as shown in FIG. 4A for SPEI $TiO_2$—$F_{64}C_{24}PcZn$ and in FIG. 4B for SPEI $F_{64}C_{24}PcZn$. (Bench B A, et al., Angew. Chem., Int. Ed. 114, 773-776 (2002); Beveridge A C, et al., J. Phys. Chem. A 107, 5138-5143 (2003); Minnes R, et al., Photochem. Photobiol. 82, 593-599 (2006); Schlothauer J C, et al., J. Biomed. Opt. 17, 115005 (2012)) Under illumination for about 50 second periods with 655 nm light, the photocurrents were suppressed upon $N_2$ purges, whether HQ was present or not, but recovered completely upon admission of air, consistent with a Type II mechanism and the high $^1O_2$ quantum yield ($\Phi_\Delta$~0.6 in acetone, methanol) previously reported for $F_{64}C_{24}PcZn$. (Minnes R, et al., Photochem. Photobiol. 82, 593-599 (2006); Bench B A, et al., Angew. Chem., Int. Ed. 114, 773-776 (2002); Beveridge A C, et al., J. Phys. Chem. A 107, 5138-5143 (2003); Schlothauer J C, et al., J. Biomed. Opt. 17, 115005 (2012)) For SPEIF$_{64}C_{24}PcZn$ (FIG. 4B), the anaerobic photocurrent (under $N_2$ atmosphere) exhibited a sign reversal in the presence of HQ (see time between about 3000 sec to 3500 sec in FIG. 4B) which suggested a direct electron transfer from HQ to $F_{64}C_{24}PcZn$ in agreement with a recent report on the direct photoreduction of $F_{64}C_{24}PcZn$ by an electron donor in strictly oxygen-free conditions. (Moons H, et al., Dalton Trans. 43, 14942-14948 (2014)) In other words the photo-oxidation of HQ, which is atom-based ($^1O_2$) in the presence of air, shifts to electron-based in $O_2$ absence: the SPE accepts electrons from the reduced, anionic $F_{64}C_{24}PcZn$ thereby regenerating continuously the original SPEI $F_{64}C_{24}PcZn$. This mechanism is specific to SPEI $F_{64}C_{24}PcZn$ since the lack of electronic connection between the SPE surface and $F_{64}C_{24}PcZn$ in SPEITiO$_2$—$F_{64}C_{24}PcZn$ precludes the appearance of a photocurrent in the absence of $O_2$ (as shown in FIG. 4A between about 1300 to about 2250 seconds).

Example 3

Signal Dependency on Electrodes and Applied Potentials

Figure 5:
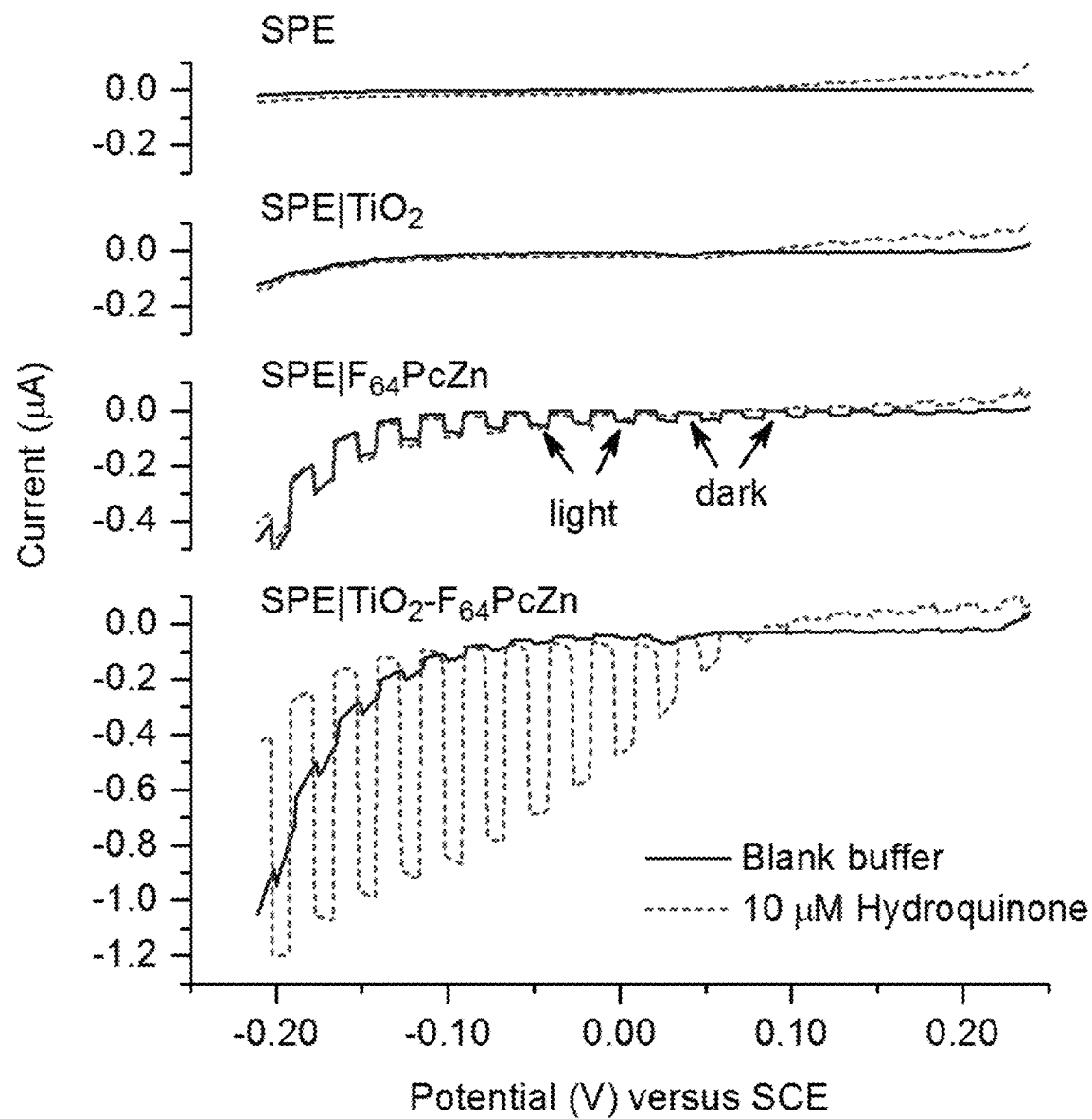
FIG. 5 is linear sweep voltammetry traces for SPE, SPEITiO$_2$, SPEITiO$_2$—$F_{64}C_{24}PcZn$, and SPEI $F_{64}C_{24}PcZn$, respectively in the absence (solid trace) and presence (dashed trace) of 10 µM HQ.

Variations in photocurrents function of the applied potential were investigated by linear sweep voltammetry under light-chopped illumination for SPE, SPEITiO$_2$, SPEIF$_{64}C_{24}PcZn$ and SPEITiO$_2$—$F_{64}C_{24}PcZn$ for a buffer solution (solid lines) and HQ (dotted lines) as shown in FIG. 5. The samples were subjected to alternating illumination and dark periods of 50 s each using 655 nm wavelength light.

SPE and the SPEITiO$_2$ showed no photocurrent response either in the blank buffer solution (solid line) or using HQ as an analyte (dotted line). In contrast, a photocurrent response was observed for SPEIF$_{64}C_{24}PcZn$ and SPEITiO$_2$—$F_{64}C_{24}PcZn$ due to the formation of $^1O_2$ and its subsequent reduction at the electrode surface. Higher values of the photocurrent are noted in the presence of HQ due to its redox cycling (see mechanism in FIG. 1D-1E). At similar $F_{64}C_{24}PcZn$ loadings and in the absence of HQ the response of SPEIF$_{64}C_{24}PcZn$ is higher relative to that of SPEITiO$_2$—$F_{64}C_{24}PcZn$ (FIG. 5C-5D, solid traces). Moreover, when 10 μM HQ is added (FIGS. 5C-5D, dotted traces), the SPEITiO$_2$—$F_{64}C_{24}PcZn$ photocurrent increases 20-fold, while the response of SPEIF$_{64}C_{24}PcZn$ is unchanged.

Figure 6:
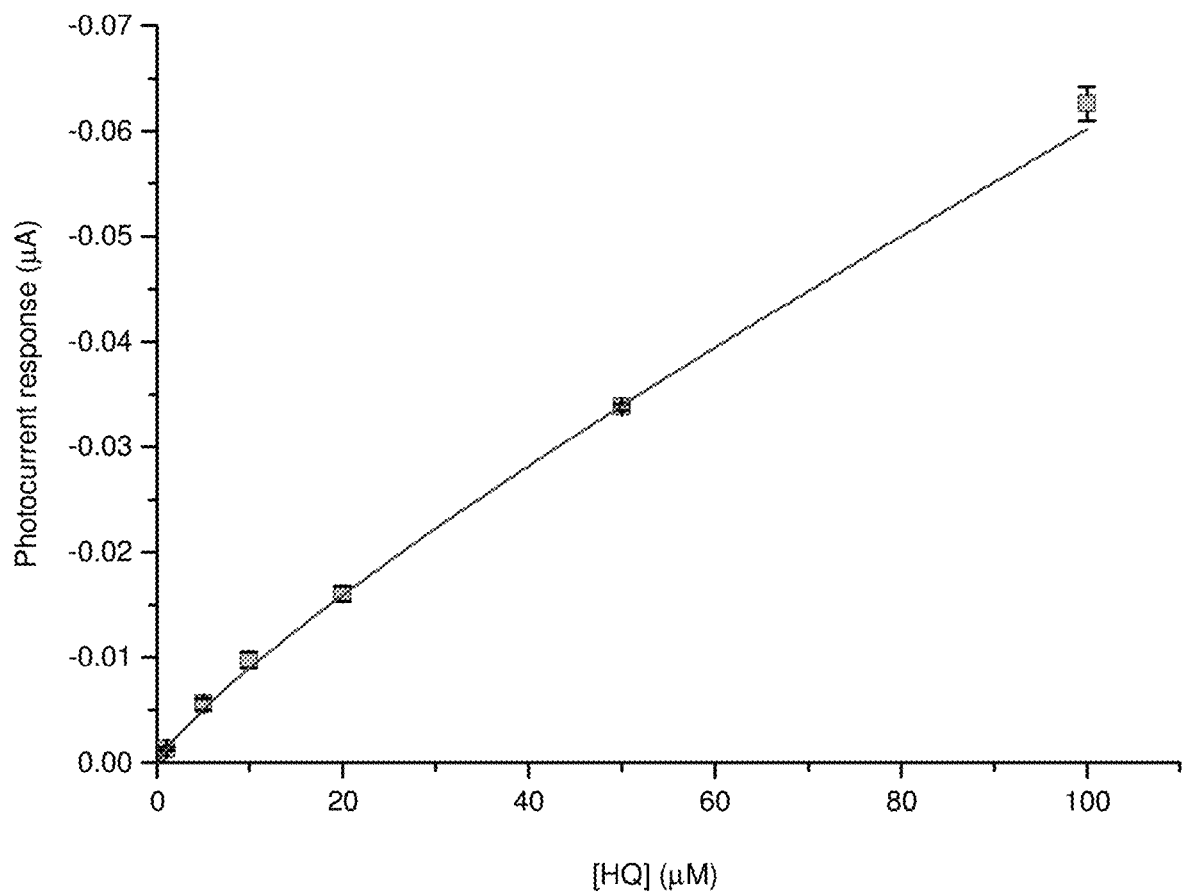
FIG. 6 is a plot of photocurrent dependence on the concentration of an analyte in accordance with some embodiments of the disclosure.

More detailed amperometric measurements at higher HQ concentrations revealed that SPEIF$_{64}C_{24}PcZn$ is 50-fold less sensitive to HQ relative to SPEITiO$_2$—$F_{64}C_{24}PcZn$ (FIG. 6). These measurements were conducted under an applied potential of about −0.1V using a red diode laser at about 655 nm and about 30 mW. The error bars in FIG. 6 represent a standard deviation based on four measurements. These observations could be rationalized considering where the photocurrent trigger ($^1O_2$) is produced, its lifetime in water, and the time it takes to diffuse through water to the SPE. $^1O_2$ has a limited lifetime in water of about 3.5 μs. (Wilkinson F, et al., J. Phys. Chem. Ref. Data 24, 663 (1995)) The diffusion coefficient of $O_2$ in water is about $2.10^{-5}$ $cm^2$ $s^{-1}$. Thus, $^1O_2$ can diffuse about 200 nm during its lifetime of about 3.5 μs, which is commensurate with the thickness of an $F_{64}C_{24}PcZn$ layer in SPEI $F_{64}C_{24}PcZn$. In contrast, the $TiO_2$—$F_{64}C_{24}PcZn$ layer of SPEITiO$_2$—$F_{64}C_{24}PcZn$ is thicker such that a portion of the $F_{64}C_{24}PcZn$ is outside the $^1O_2$ diffusion radius and thus the $^1O_2$ produced decays before reaching the electrode, leading to a lower value of the photocurrent. However, once HQ is present the more stable but redox active BQ occupies a much larger diffusion volume and thus all $F_{64}C_{24}PcZn$ of SPEITiO$_2$—$F_{64}C_{24}PcZn$ (same loading as SPEI $F_{64}C_{24}PcZn$) contributes now to the photocurrent. The significantly higher activity of SPEITiO$_2$—$F_{64}C_{24}PcZn$ vs. SPEI $F_{64}C_{24}PcZn$ is due to the highly dispersed state of $F_{64}C_{24}PcZn$ supported on nanosize $TiO_2$, as opposed to it being present as a thin film, e.g., SPEI $F_{64}C_{24}PcZn$.

Figure 7A:
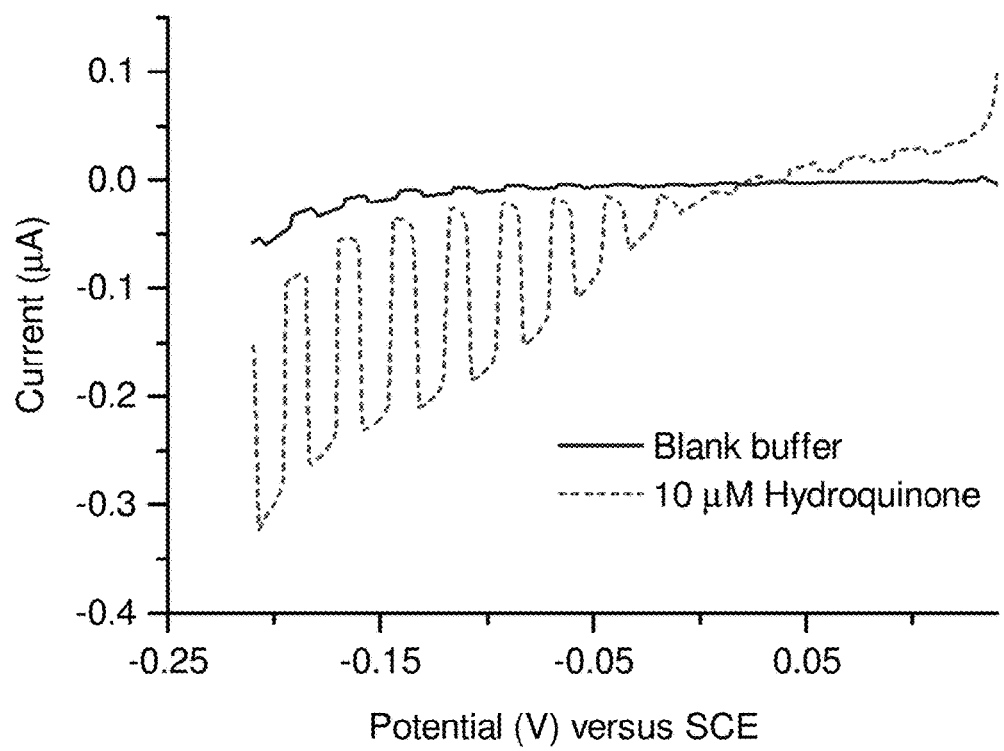
FIG. 7A is linear sweep voltammetry traces for SPEI-SiO$_2$—$F_{64}C_{24}PcZn$ in the absence (solid trace) and presence (dashed trace) of 10 µM HQ.
Figure 7B:
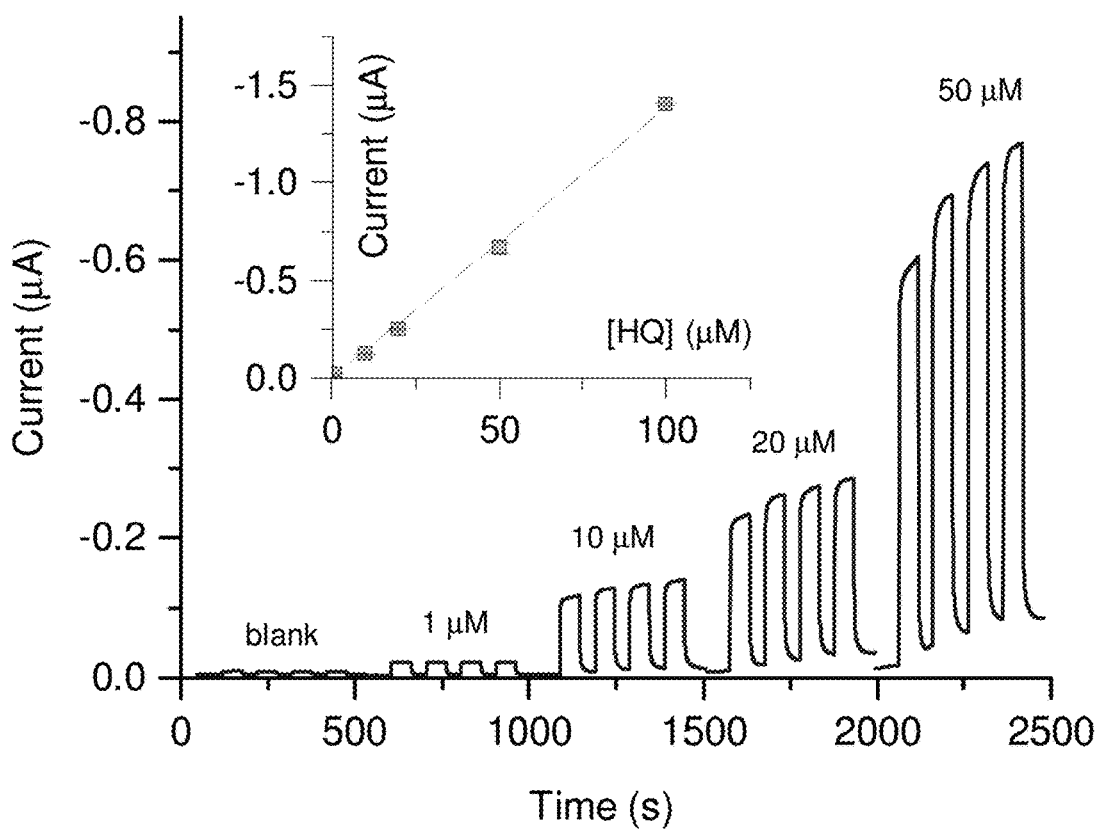
FIG. 7B is an amperometric response of SPEISiO$_2$—$F_{64}C_{24}PcZn$ as a function of concentration of an analyte in accordance with some embodiments of the disclosure.

The photoinactivity of semiconducting $TiO_2$ under low-energy, 655 nm illumination was verified by testing the similar SPEISiO$_2$—$F_{64}C_{24}Zn$ electrode prepared from $SiO_2$. SPEISiO$_2$—$F_{64}C_{24}PcZn$ exhibited roughly the same activity (FIG. 7A-7B) as SPEITiO$_2$—$F_{64}C_{24}PcZn$, thus verifying $TiO_2$ being exclusively a supporting matrix. (Gorun S M, et al., U.S. Pat. No. 9,260,630) FIG. 7A is a linear sweep voltammetry trace for SPEISiO$_2$—$F_{64}C_{24}PcZn$ in the presence of a buffer solution (solid line) and HQ (dotted line). FIG. 7B is an amperometry measurement at a constant potential of −0.1 V at concentrations of HQ ranging from 0 to about 50 μM.

Photocurrents in the buffer solution and HQ depended quasi-linearly on the photosensitizer loading for SPEIF$_{64}C_{24}PcZn$ and eventually plateaus, and linear for SPEITiO$_2$—$F_{64}C_{24}PcZn$ (FIG. 8A-8D), as expected for heterogenous catalytic processes. FIG. 8A-8D measure photocurrent as a function of an amount of $F_{64}C_{24}PcZn$. Electrodes with $F_{64}PcZn$ were prepared by drying 5 μl of 0.01-0.3 mg $ml^{-1}$ $F_{64}PcZn$ prepared in water from 3 mg $ml^{-1}$ stock solution in ethanol. Electrodes with $TiO_2$—$F_{64}PcZn$ were prepared from 10 mg $ml^{-1}$ aqueous suspension of $TiO_2$ containing 0.5-3 wt % $F_{64}PcZn$. The photocurrent was measured at a constant potential of −0.1 V vs SCE using a diode laser at 655 nm and 30 mW. The error bars in FIGS. 8A-8D represent a standard deviation of four measurements. A higher linearity is obtained for the matrix supported $F_{64}C_{24}PcZn$ electrodes, consistent with a load-independent reactivity-type imparted by a non-aggregating, single-site catalyst condensed as thin films or supported on oxidic materials. This observation validates the anticipated, beneficial role of steric hindrance in insuring maximum photophysical activity. The photocurrent plateau observed for SPEIF$_{64}$C$_{24}$PcZn suggests that thicker F$_{64}$C$_{24}$PcZn layers provide diminishing electron transfer ability, again consistent with steric site-isolation and lack of intermolecular electron coupling, as additionally evidenced by the EPR of magnetically isolated, isostructural F$_{64}$PcCu. (Moons H, et al., Inorg. Chem. 49, 8779-8789 (2010))

Example 4

Photocurrents Dependency on Light Sources

Figure 9:
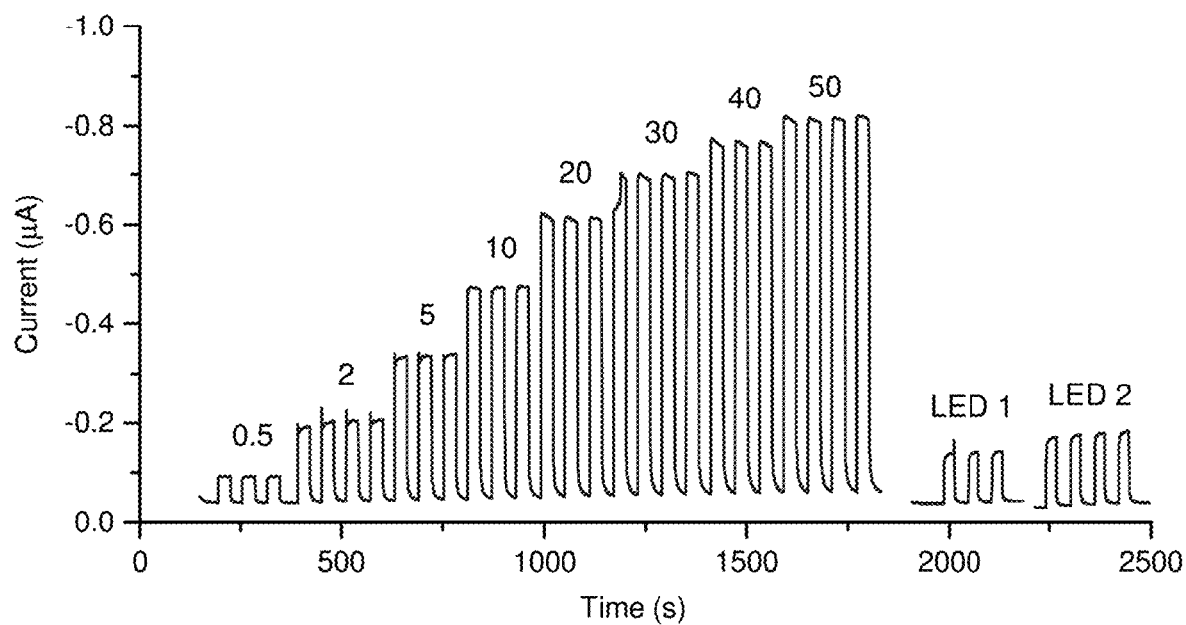
FIG. 9 is an amperometric response of $TiO_2$—$F_{64}C_{24}PcZn$ in the presence of an analyte as a function of laser power in accordance with some embodiments of the disclosure.
Figure 10:
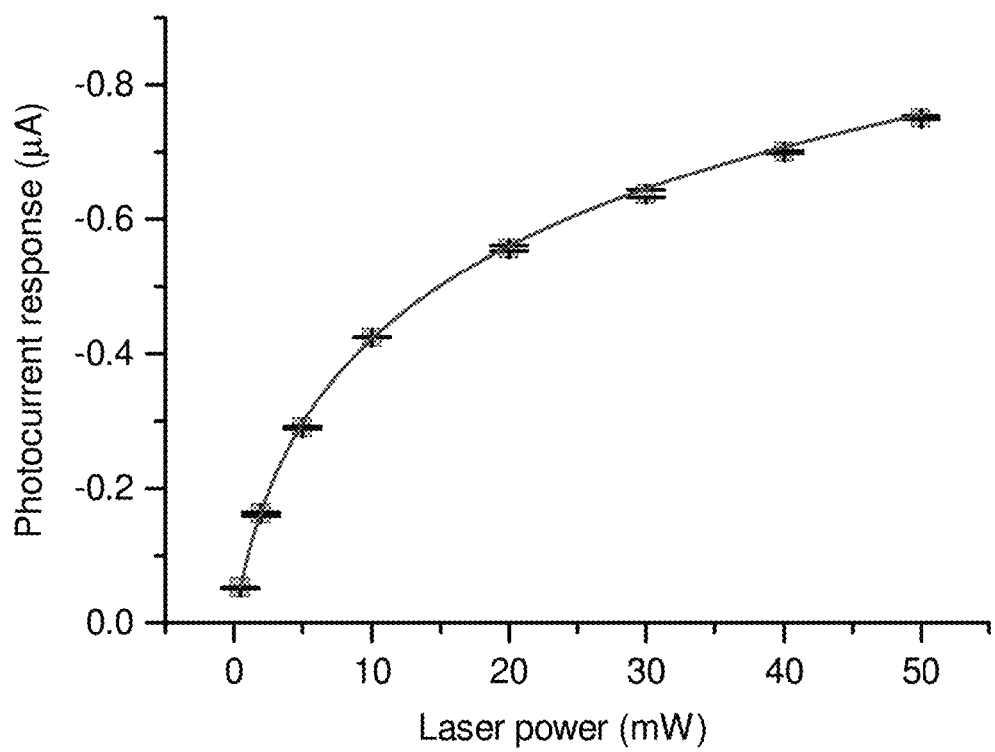
FIG. 10 is a plot of photocurrent as a function of laser power in accordance with some embodiments of the disclosure.

Amperometry measurements for SPEITiO$_2$—F$_{64}$C$_{24}$PcZn were recorded in the presence of 10 μM HQ in a buffer solution containing 0.1 M KCl, 0.02 M KH$_2$PO$_4$, pH=7 at an applied potential of −0.1 V. The sample volume was about 80 μl, and photocurrent was generated using a diode laser at 655 nm at powers ranging from about 0.5 to about 50 mW (FIG. 9). The photocurrent increased at a steep rate up to about 20 mW (FIG. 10) but tended to plateaus the power approached 50 mW. The error bars in FIG. 10 represent the standard deviation of 3 measurements. For comparison (FIG. 9), illuminations with two typical red LED lamps (GaAlAs, 660 nm) are given. LED 1, L-7113SRC-DV, 2100 mcd, of 5 mm in diameter; and LED 2, L-793SRC-E, 3000 mcd, 8 mm in diameter. LED 1 and LED 2 provide a response equivalent to laser powers of 1.2 and 1.7 mW or 15.6 and 22.4% of the sensitivity at about 30 mW, respectively. The positive response using LED light sources indicates that it is a viable alternative to a laser light source.

Example 5

Detection of Phenolic Analytes

HRP was reported to be a promising reagent for the detection of phenols through their oxidation to redox active derivatives. (Yang S, et al., Electrochim. Acta 52, 200-205 (2006); Imabayashi S-i, et al., Electroanalysis 13, 408-412 (2001); Munteanu F D, et al., Anal. Chem. 70, 2596-2600 (1998); Korkut S, et al., Talanta 76, 1147-1152 (2008); Yang S, et al., Sens. Actuators, B 114, 774-780 (2006)). A Type II photosensitizer is now used for the same purpose, therefore, a detection mechanism is proposed (FIG. 1D-1E) This proposal is consistent with the reported pathway for photocatalytic degradation of phenol and phenolic derivatives, including pollutants and pharmaceuticals. (Piwowar K, et al., Appl. Surf. Sci. 359, 426-431 (2015); Li C, et al., J. Phys. Chem. A 104, 5998-6002 (2000); Briviba K, et al., Chem. Res. Toxicol. 6, 548-553 (1993); Gryglik D, et al., J. Hazard. Mater. 146, 502-507 (2007); Lemp E, et al., J. Photochem. Photobiol., A 168, 91-96 (2004); Díez-Mato E, et al., Appl. Catal., B 160-161, 445-455 (2014))

Figure 11:
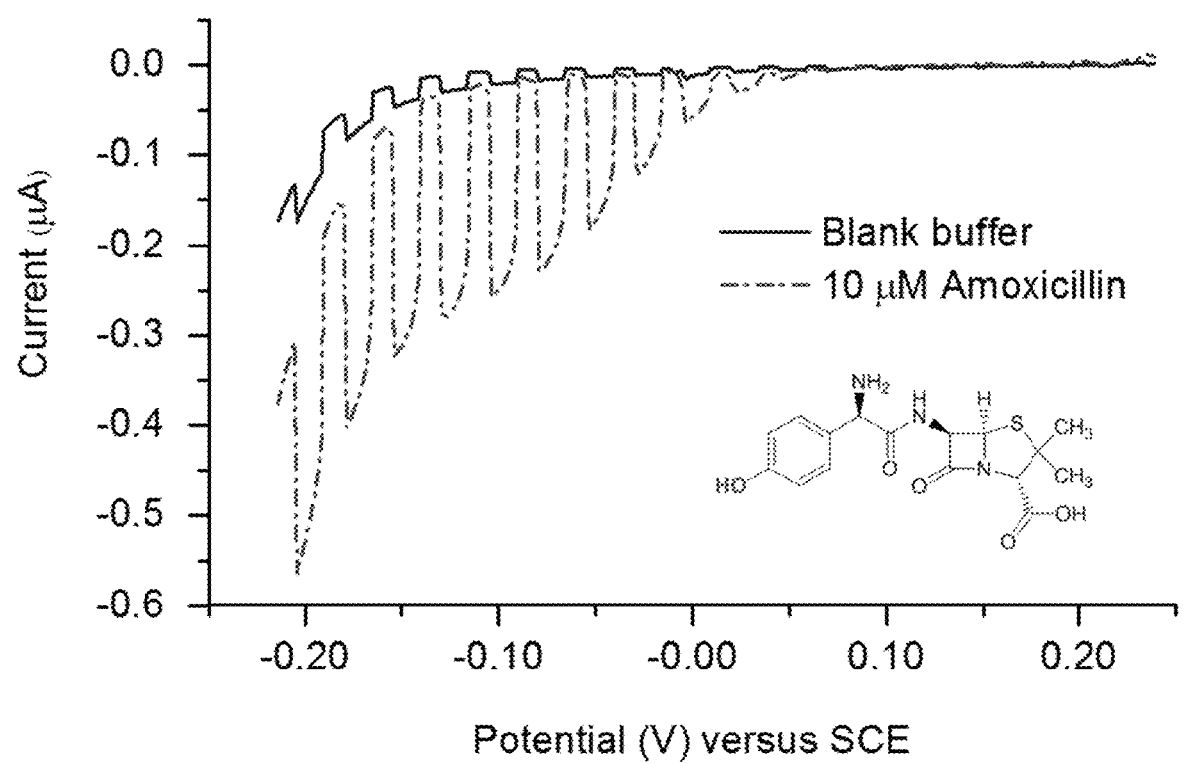
FIG. 11 is linear sweep voltammetry traces for SPEITiO$_2$—$F_{64}C_{24}PcZn$ in the absence (solid trace) and presence (dashed trace) of 10 µM Amoxicillin in accordance with some embodiments of the disclosure.

Amoxicillin, a β-lactam antibiotic containing a phenolic moiety was used to test the efficiency of the proposed detection strategy. Linear sweep voltammetry (LSV) traces recorded for TiO$_2$-F$_{64}$C$_{24}$PcZn electrode in the absence (blank buffer solution, solid line) and presence (analyte solution, dotted line) of 10 μM amoxicillin (FIG. 11). The results are shown for scans range from about 0.24 to about −0.21 V with a scan rate of about 0.25 mV s$^{-1}$. Similar to HQ, amoxicillin triggers a potential-dependent rise (FIG. 11, dotted line) of the photocurrent, which remains constant beyond a potential of around −0.1 V vs. SCE. By analogy with HQ, a $^1$O$_2$-mediated photo-oxidation of amoxicillin yielding a redox active product may occur, followed by the reduction of this product at the electrode. This mechanistic proposal is based on the reported reaction of $^1$O$_2$ with the 4-hydroxyphenyl moiety of amoxicillin via a [2+2] cycloaddition which yields an unstable 1,4-endoperoxide that, in turn decays to the corresponding p-peroxyquinol. (Li C, et al., J. Phys. Chem. A 104, 5998-6002 (2000); García N A, J. Photochem. Photobiol., B 22, 185-196 (1994)) A minor product, a 3,4-dihydroxyphenyl derivative can be additionally formed, similar to the oxidation of tyrosine by $^1$O$_2$. (Grosvenor A J, et al., Amino Acids 39, 285-296 (2010))

Figure 12A:
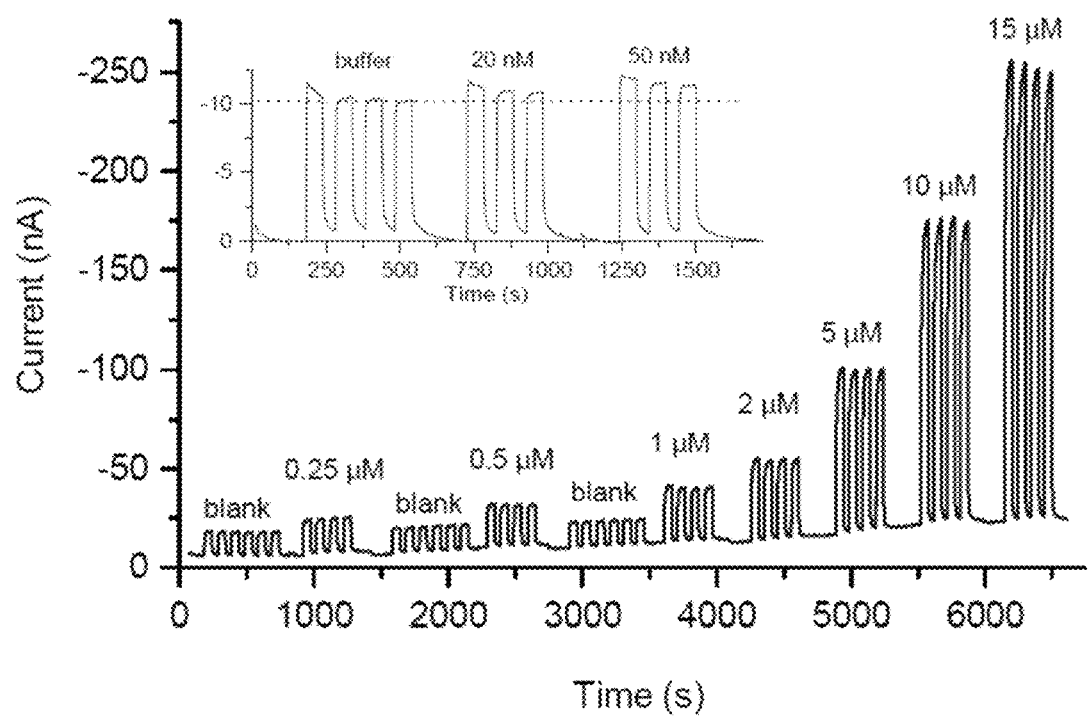
FIG. 12A is an amperometric response of SPEITiO$_2$—$F_{64}C_{24}PcZn$ in a blank buffer and in amoxicillin in accordance with some embodiments of the disclosure.
Figure 12B:
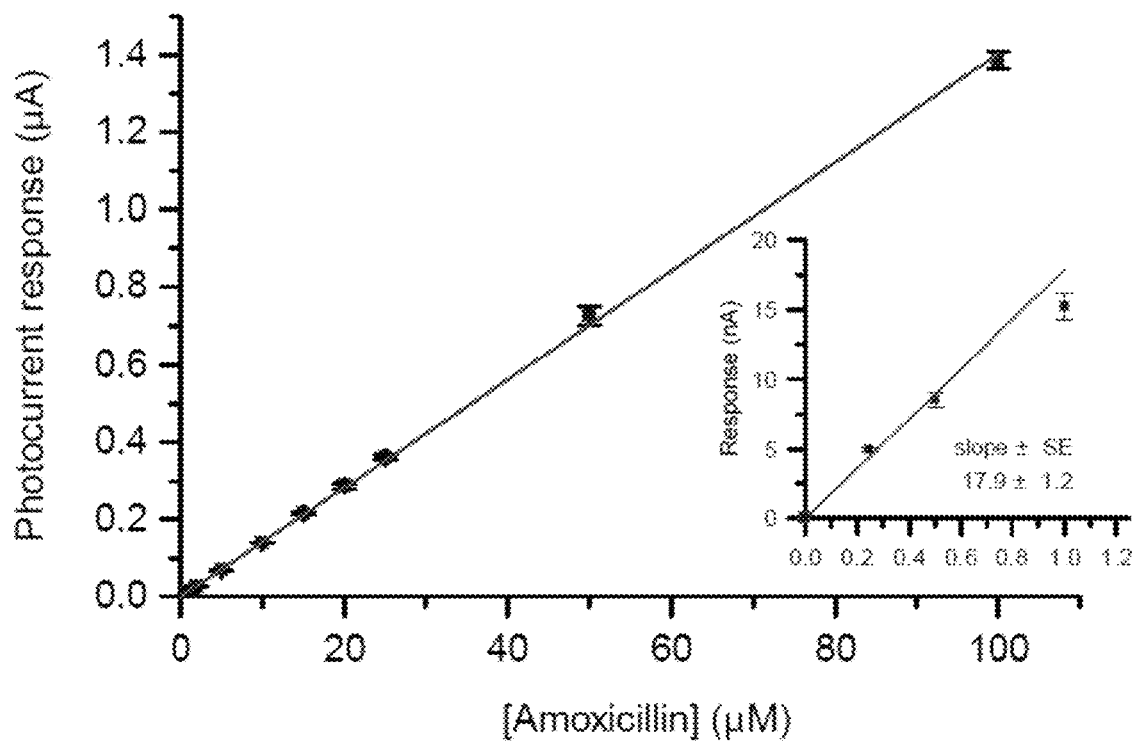
FIG. 12B is a calibration curve for photocurrent response of Amoxicillin in accordance with some embodiments of the disclosure.
Figure 13A:
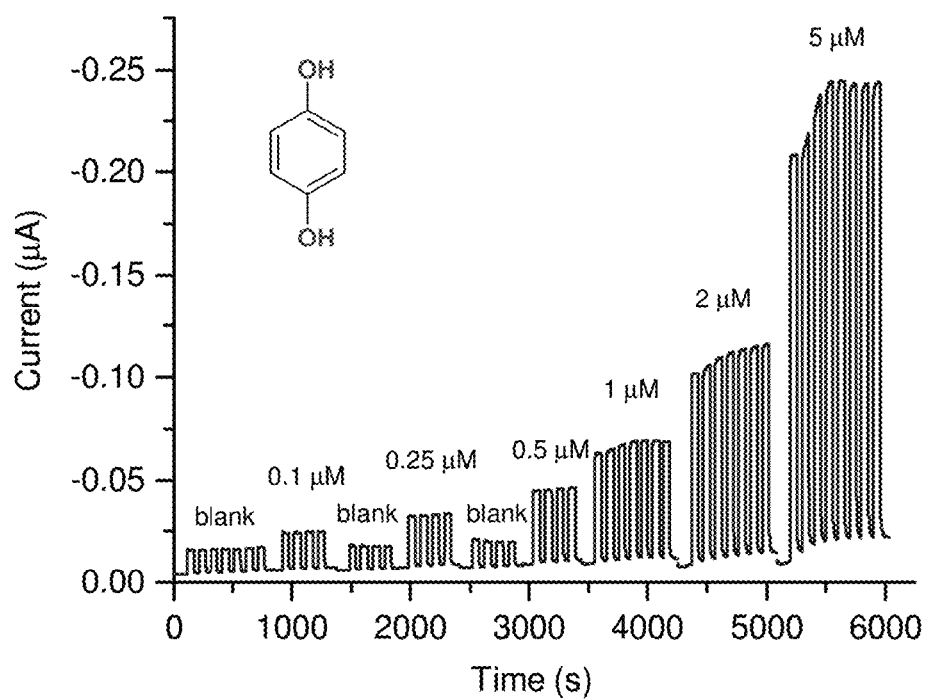
FIG. 13A is an amperometric response of HQ as a function of concentration in accordance with some embodiments of the disclosure.
Figure 13B:
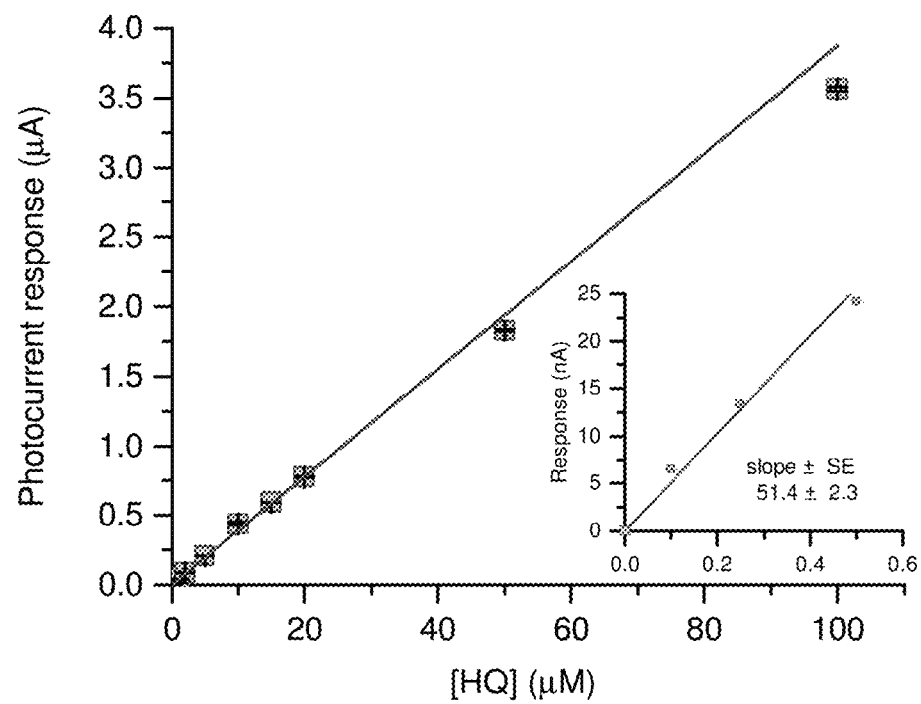
FIG. 13B is a plot of photocurrent as a function of HQ concentration.

FIG. 12A is a plot of current at constant voltage of about −0.1V for an analyte solution containing amoxicillin ranging in concentration from 0 to about 15 μM. Sample volume of the drop was about 80 μl. A diode laser at 655 nm and about 30 mW was used as a light source. FIG. 12B is a plot of the photocurrent as function of the concentration of amoxicillin. Data for FIG. 12B were presented as mean (±s.d.) of four consecutive measurements. FIG. 12B reveals that the sensitivity was about 0.14 A M$^{-1}$ cm$^{-2}$ in the low concentration range, corresponding to the limit of detection (LOD) about 22 nM, calculated from the 3 s.d. value of the background signal (s.d. =0.13 nA, n=16). The photocurrents for HQ were about three times higher compared to amoxicillin possibly because of the slower photo-oxidation kinetics for amoxicillin compared to HQ at the same conditions (FIG. 13A and 13B). The sensitivity for HQ was about 0.41 A M$^{-1}$ cm$^{-2}$ with a LOD of about 12 nM.

Notably, the LOD values for both amoxicillin and HQ were about two orders of magnitude lower compared to a recently reported system using iron phthalocyanine designed for dopamine detection, and one-two orders of magnitude lower compared to HRP-modified electrodes used for the detection of phenolic compounds. (Neto S Y, et al., Electrochem. Commun. 62, 1-4 (2016); Yang S, et al., Electrochim. Acta 52, 200-205 (2006); Imabayashi S-i, et al., Electroanalysis 13, 408-412 (2001); Korkut S, et al., Talanta 76, 1147-1152 (2008); Yang S, et al., Sens. Actuators, B 114, 774-780 (2006)) Similar, favorable results are noted following a comparison with previously published phenolic analytes, as well as with amoxicillin determinations using different electrochemical methods.

Example 6

Sensitivity of Detection for Phenols

Selectivity of the detection methods was evaluated for several different phenols. Ampicillin, which lacks the aromatic hydroxyl group of amoxicillin, as well as benzylpenicillin, nafcillin, and 6-aminopenicillanic acid produced no noticeable photocurrents even in concentrations as high as 100 μM (Table 1 and FIG. 14). Several phenols, were evaluated next (Table 2). Setting hydroquinone to 100, the relative sensitivities are: 4-aminophenol, 113; 2-chlorophenol, 44; bisphenol A, 39; amoxicillin, 32. Surprisingly, only a minor response was observed for 4-methylphenol, 1. Phenol, bisphenol A, 4-nitrophenol, and 2-chlorophenol have longer response times, 50-100s, in comparison to HQ, 10 s, likely due to their slow reactions with $^1$O$_2$.[45] Reaction rates increase with the pH, (Scully F E, et al. Chemosphere 16, 681-694 (1987)) a change to pH 12 results in both a fast response, 5 s, as well as a fivefold increase in sensitivity, as demonstrated for phenol and bisphenol A (Table 2).

Figure 14:
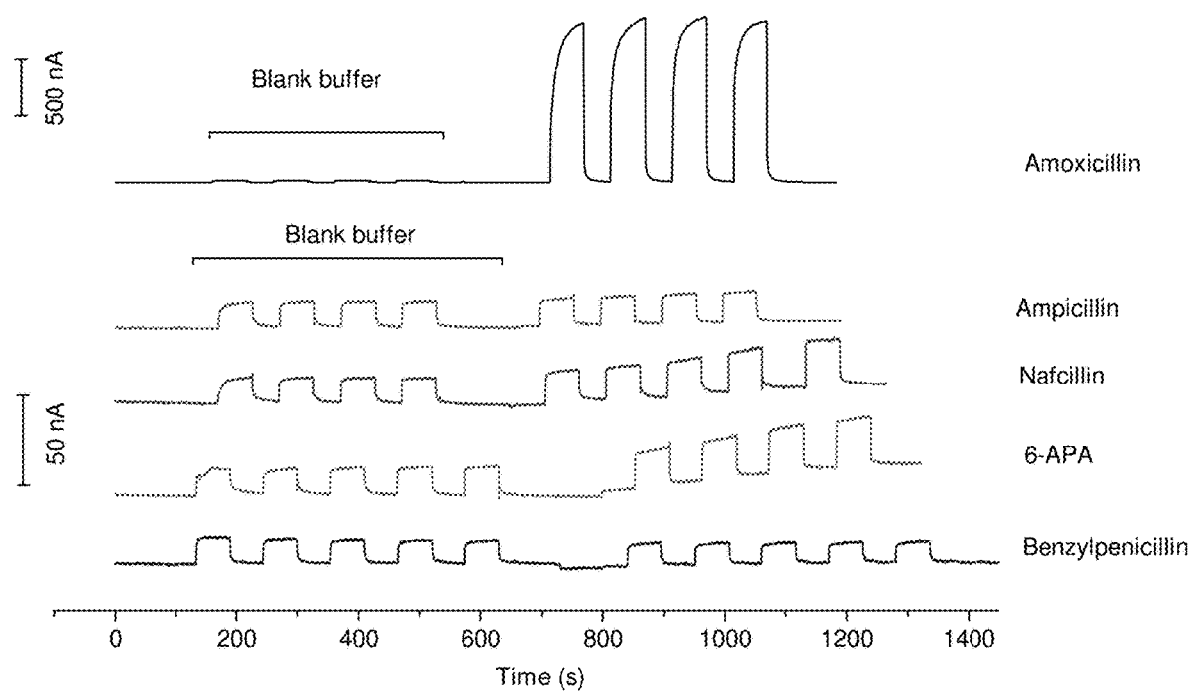
FIG. 14 is an amperometric response of SPEITiO$_2$—$F_{64}C_{24}PcZn$ in the presence of buffer and then analytes in accordance with some embodiments of the disclosure.

FIG. 14 illustrates amperometry measurements using SPEITiO$_2$—F$_{64}$PcZn at a constant potential of −0.1 V in a blank buffer solution and in an analyte solution of 100 µM amoxicillin in comparison to three different analytes, i.e., penicillins (amplicillin, nafcilin, and benzylpenicillin) and 6-aminopenicillanic acid (6-APA) at 100 µM analyte concentration. The light source was a red diode laser at about 655 nm, and about 30 mW. The amplitude of the photocurrent responses to 100 µM concentrations of three different penicillins and the 6-APA penicillin precursor in comparison to amoxicillin are shown in Table 1. Data were presented as mean (± s.d.) of four consecutive measurements.

TABLE 1

| Compound | Photocurrent response ± s.d. (nA) |
|---|---|
| Amoxicillin | 1387 ± 23 |
| Ampicillin | 1.2 ± 0.8 |
| Benzylpenicillin | −1.0 ± 0.8 |
| Nafcillin | 6.8 ± 3.7 |
| 6-aminopenicillanic acid (6-APA) | 7.6 ± 2.9 |

Example 7

Comparison of $F_{64}C_{24}PcZn$ and HRP Performances

Figure 15:
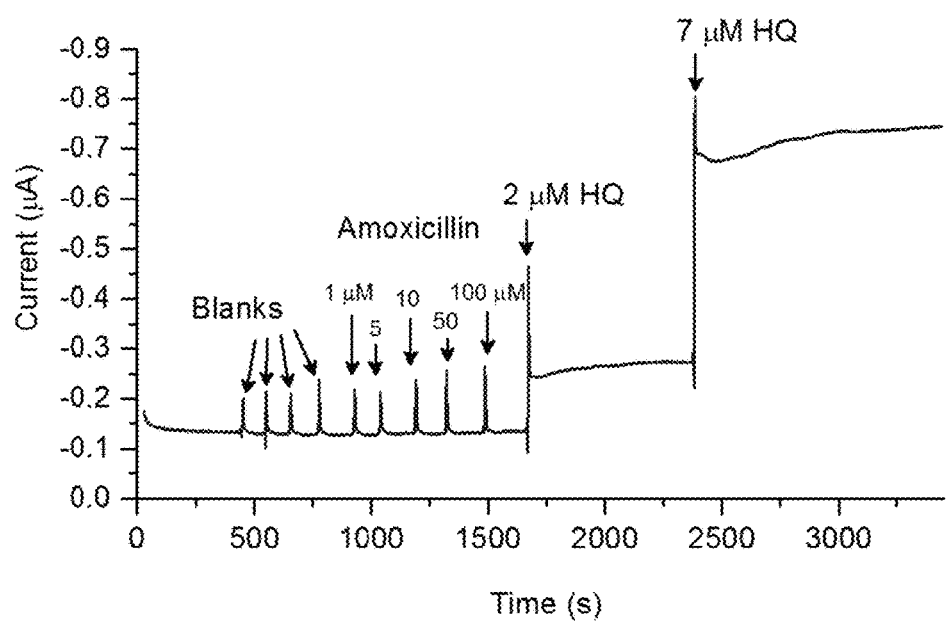
FIG. 15 is an amperometric response of SPEITiO$_2$—HRP in a blank buffer, amoxicillin, and HQ solutions.

A direct comparison between $F_{64}C_{24}PcZn$ and HRP modified electrodes provides more insights into the proposed method. To our knowledge, the detection of amoxicillin using an enzymatic biosensor has not been reported. Thus, a SPE|TiO$_2$—HRP electrode, analogous with SPE|TiO$_2$—$F_{64}C_{24}PcZn$ was constructed. The HRP-based electrode detected HQ with sensitivity similar to that of TiO$_2$—$F_{64}C_{24}PcZn$ (FIG. 15), but it did not detect amoxicillin, substantiating the advantages of catalytic, $^1O_2$-mediated detection strategy.

Figure 16:
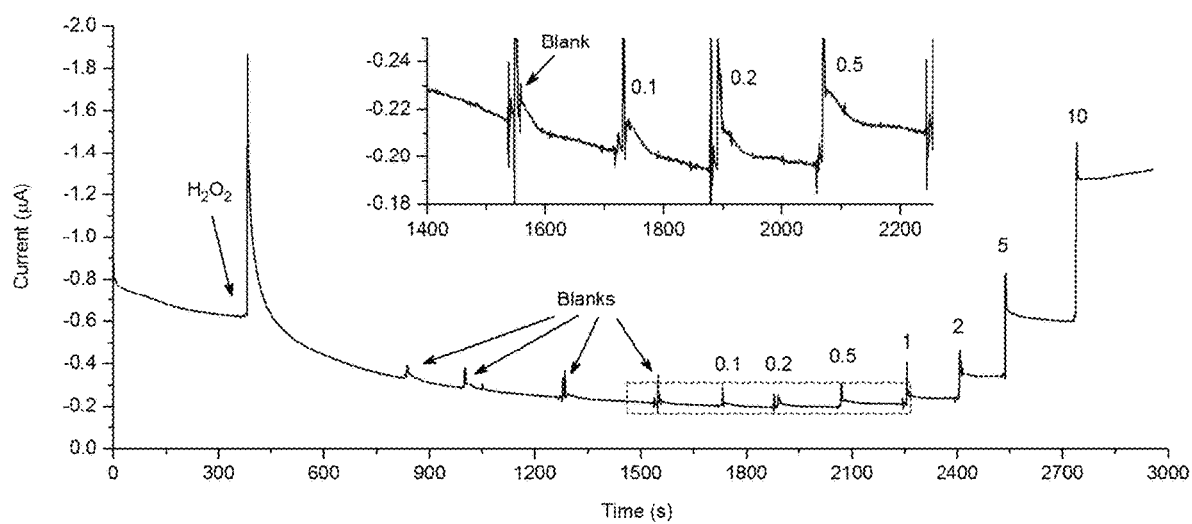
FIG. 16 is an amperometric response of SPEITiO$_2$—HRP in HQ solution.

The favorable sensitivity reported below (Table 2) is dependent on the signal-to-noise ratio of the detection method. The photocurrent of the SPE|TiO$_2$—HRP was observed to fluctuate upon the addition of $H_2O_2$ when low concentrations of HQ were measured (FIG. 16), consistent with known $H_2O_2$ problems. (Lindgren A, et al., Anal. Chim. Acta 347, 51-62 (1997)) Mitigation attempts by disconnecting and reconnecting the electrode exacerbated the baseline instability. A second remedy was tried by maintaining the reaction volume strictly constant. Hence, HQ was introduced by removing 20 µl from the total volume (100 µl) and returning the same volume of HQ solution also containing $H_2O_2$. Thus, measurements were performed continuously without switching off the cell or affecting noticeably the concentration of $H_2O_2$. The addition of 0.1 µM HQ after 20 min of the baseline stabilization elicited no clear response (FIG. 16). The lowest concentration detected was 0.2 µM although the sensitivity of the electrode, 0.39 A M$^{-1}$ cm$^{-2}$ was similar to that of SPE|TiO$_2$—$F_{64}C_{24}PcZn$. The extrapolation of the baseline beyond the time the sample is introduced, however, is problematic rendering the LOD values uncertain.

In this respect, a distinct LOD advantage was obtained since switching off the light reveals the baseline current under the experimental measuring conditions, thereby affording a simple, straightforward correction if necessary. Moreover, while the photoelectrochemical and HRP-based approaches reveal similar selectivity patterns (Table 2), the phthalocyanine, unlike HRP, is stable at elevated pH values. A higher pH favors the reaction of phenols with $^1O_2$, and might be encountered when measuring analytes in basic wastewaters. In general, enzymes function only within narrow pH ranges, a condition which is less restrictive in the case of chemically robust photosensitizers. (Scully FE, et al., Chemosphere 16, 681-694 (1987))

TABLE 2

| | SPE\|TiO$_2$—$F_{64}C_{24}PcZn$ | SPE\|TiO$_2$—HRP |
|---|---|---|
| Hydroquinone | 100 | 100 |
| Catechol | 12 | 38 |
| Phenol | 16 | 35 |
| Bisphenol A | 39 | 0.9 |
| 2-Chlorophenol | 44 | 10 |
| 3-Nitrophenol | 1.3 | 0.3 |
| 4-Nitrophenol | 13 | 0.7 |
| 2-Aminophenol | 10 | 26 |
| 3-Aminophenol | 17 | 7.5 |
| 4-Aminophenol | 113 | 70 |
| 2-Amino-4-chlorophenol | 19 | 96 |
| 3-Cyanophenol | 5.3 | No response |
| 4-Cyanophenol | 6.5 | No response |
| 4-Methylphenol | 1.2 | 0.7 |
| Amoxicillin | 32 | No response |
| 1,1'-Ferrocene-dimethanol | 6.3 | — |
| L-Ascorbic acid | No response | — |
| 10x L-Ascorbic acid | 1.0 | — |
| 100x L-Ascorbic acid | 7.4 | — |
| Hydroquinone + L-Ascorbic acid (1:1) | 98 | — |
| Hydroquinone + L-Ascorbic acid (1:10) | 80 | — |
| Hydroquinone + L-Ascorbic acid (1:100) | 51 | — |
| HQ (pH 12) | No response | — |
| Catechol (pH 12) | No response | — |
| Phenol (pH 12) | 86 | — |
| Bisphenol A (pH 12) | 213 | — |

Relative responses of SPE|TiO$_2$—$F_{64}C_{24}PcZn$ and SPE|TiO$_2$—HRP modified electrodes to phenolic compounds present in 10 µM concentration are shown in Table 2. The various analytes presented in Table 2 are prepared and measured in the same manner described above for the analytes in Table 1 when SPE|TiO$_2$—$F_{64}C_{24}PcZn$ is used as the electrode. In contrast, HRP requires hydrogen peroxide ($H_2O_2$) for catalysis. Accordingly, the buffer solution, used to measure responses of the analytes when SPE|TiO$_2$—HRP is used as an electrode, further included 1 mM $H_2O_2$. A blank buffer solution for HRP included 1 mM $H_2O_2$. Hydroquinone was assigned a response factor of 100 for both SPE|TiO$_2$—$F_{64}C_{24}PcZn$ and SPE|TiO$_2$—HRP. 1,1'-Ferrocene dimethanol is included for comparison as a one-electron donor while ascorbic acid, which oxidizes irreversibly, is included as a singlet oxygen quencher.

In contrast to phenols, ascorbic acid is an example of a compound that can rapidly but irreversibly react with singlet oxygen. (Bodannes R S, et al., Febs Letters 105, 195-196 (1979)) The lack of the redox cycling limits its photocurrent response. Indeed, the sensitivity of the proposed electrode to HQ is three orders of magnitude higher compared to that for ascorbic acid, as evidenced by the appearance of only a minor photocurrent response even when the concentration of ascorbic acid exceeds 100 µM (Table 2). Notably, ascorbic acid does not suppress the response of HQ at a 1:1 molar ratio. The photocurrent intensity is halved only if ascorbic acid is present in 100 fold excess. Applications for the detection of phenols in the presence of ascorbic acid, for example in fruits and beverages are thus possible since the phenols are always present in excess. (Vinson J A, et al., Journal of Agricultural and Food Chemistry 49, 5315-5321 (2001))

Example 8

Photosensitizers as Labels of Biomolecules

The photosensitizers can be used as labels for biomolecules. As illustrated in FIGS. 8A, 8C, the photocurrent is proportional to the amount of the photosensitizer either being directly deposited on the working electrode or dispersed on support particles, while the photocurrent is negligible in the absence of the photosensitizer (FIGS. 5A, 5B). The possibility to use photosensitizers coupled to biomolecules was illustrated by a model detection scheme consisted of two complementary oligonucleotides. One oligonucleotide is attached to a conductive material of the working electrode and the second oligonucleotide is coupled to a photosensitizer generating singlet oxygen. A commercially available oligonucleotide of 15 bases labeled by Pheophorbide A, a chlorophyll-derived, well-known photogenerator of singlet oxygen apoporphyrin was used, consistent with its $F_{64}C_{24}$PcZn-related ex vivo reactivity. (DeRosa M, et al., Coord. Chem. Rev. 233-234, 351-371 (2002); Fernandez J M, et al., J. Photochem. Photobiol., B 37, 131-140 (1997); Schlothauer J C, et al., J. Biomed. Opt. 17, 115005 (2012)) The oligonucleotide sequence was chosen to be complementary with microRNA-21, an important marker for several types of cancer and cardiovascular diseases. (Jazbutyte V, et al., Current Drug Targets 11, 926-935 (2010)) The electrodes were modified by a DNA-probe with the complementary sequence, while a non-complementary DNA-probe of the same length was used as a blank control.

Oligonucleotides were obtained from Eurogentec (Belgium). Their structures and purity were confirmed by mass-spectrometry. Sequences of the oligonucleotides were as follows: probe 1 (complementary): 5'-HS—(CH$_2$)$_6$-tagct-tatcagactgatgttga-3; probe 2 (non-complementary): 5'-HS-(CH$_2$)$_6$-tagcttatgtgtaccctgtcag-3'; oligonucleotide labeled by Pheophorbide A: 5'-Pheo-tcaacatcagtctga-3'.

Immobilization and hybridization buffers contained 500 mM KCl, 50 mM MgCl$_2$, 10 mM tris pH 7.5. The washing buffer had the same composition, but additionally contained 0.05% w/v tween 20. The measuring buffer contained 0.1 M KCl, 10 mM KH$_2$PO$_4$ and had pH=7.0.

Prior to their modification the gold disks electrodes (1.6 mm in diameter, obtained from BASi, West Lafayette, USA) were polished using diamond paste containing solids of 3, 1 and 0.25 µm particle size dispersed in an alcohol-based lubricant (DP-lubricant Struers, Ballerup, Denmark). Additional polishing was performed with an aqueous 0.05 µm particle size γ-alumina slurry (SPI Supplies, West Chester, Pa., USA). Next, the electrodes were placed in 0.5 M H$_2$SO$_4$ and subjected to a cyclic potential sweep from 0.2 to 1.45 V versus SCE with a sweep rate of 0.1 V s$^{-1}$ until a steady-state voltammogram was obtained.

For the electrodes modification a thiolated DNA-probe (0.1 mM stock solution in ultrapure water) was mixed in 1:1 ratio with a freshly prepared 10 mM tris(2-carboxyethyl)phosphine (TCEP) in the immobilization buffer. After 1 hour incubation at room temperature, the mixture was diluted 50 times with the immobilization buffer containing 0.5 µM 6-mercaptohexanol (MH). The concentration of the DNA-probe and MH in the final solutions were 1 µM and 0.5 µM, respectively. A 20 µl drop was placed on freshly prepared gold disk electrodes and left overnight at room temperature in a tightly closed chamber that prevented water evaporation. The electrodes were subsequently washed five times with immobilization buffer and incubated for 2 hours in 1 mM MH immobilization buffer solution.

Electrodes were washed five times with copious amounts of hybridization buffer and placed in the hybridization buffer solution of the labeled oligonucleotide for two hours, followed by immersion in a beaker with washing buffer solution and stirred magnetically at 350 rpm for 5 min. Photocurrents were measured in a three-electrode cell at a constant potential of −0.05 V versus SCE using a red light laser (about 655 nm, about 30 mW). If not used immediately, the electrodes were kept in the measuring buffer for maximum about 10 min.

Figure 17A:
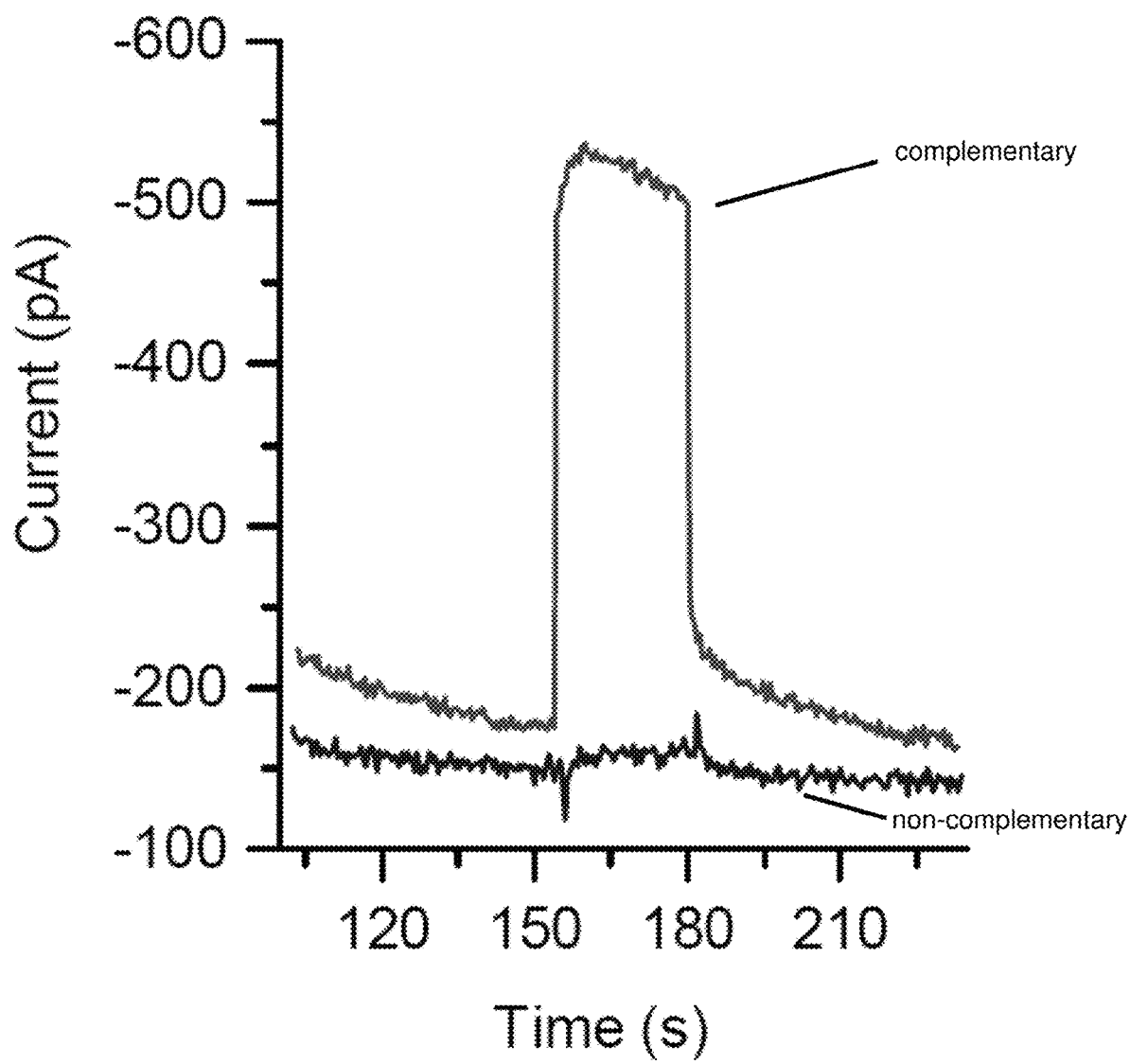
FIG. 17A is an amperometric response of complementary and non-complementary oligonucleotides labeled with a photosensitizer.
Figure 17B:
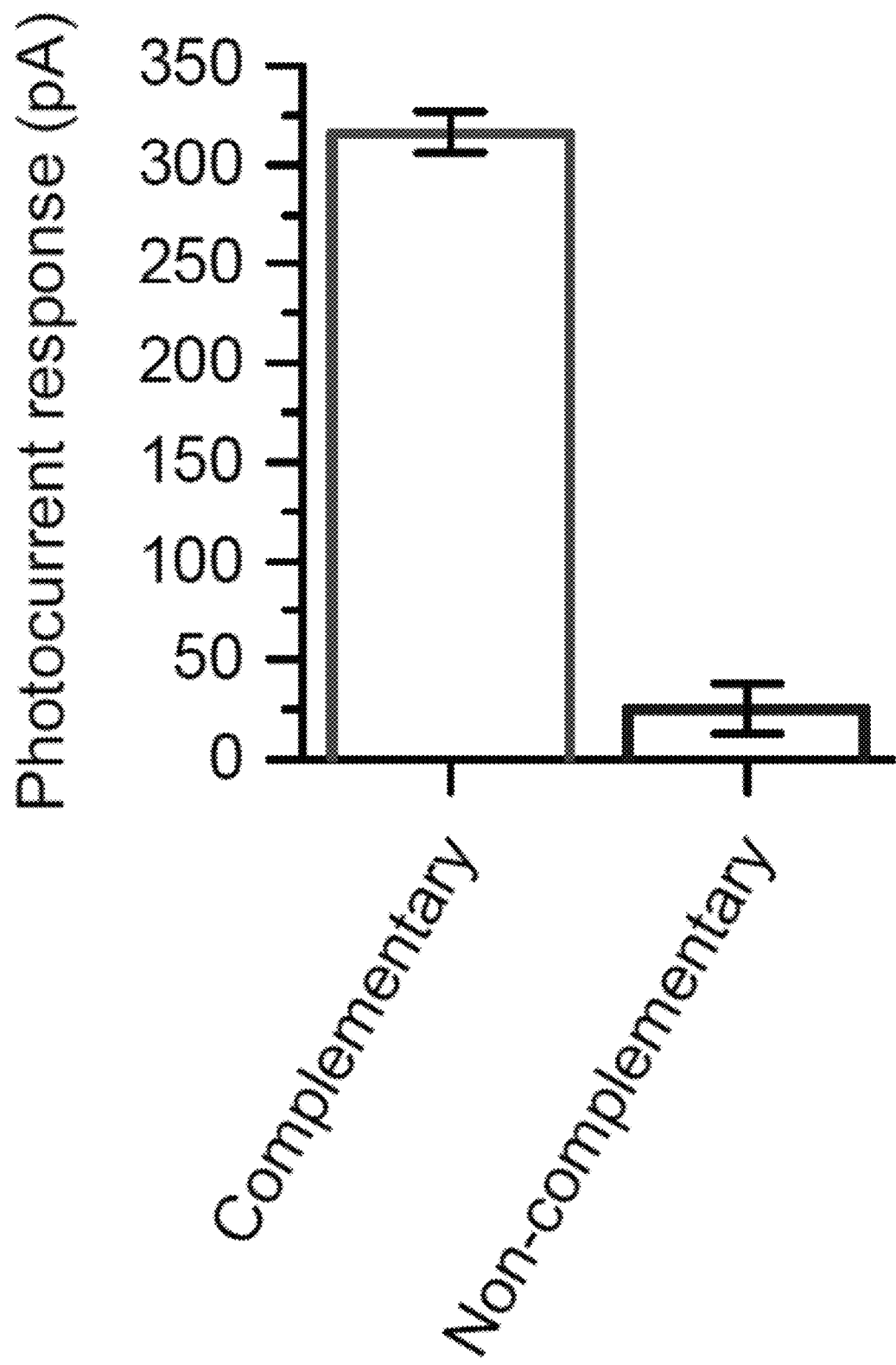
FIG. 17B is an amperometric response of the complementary and non-complementary oligonucleotides labeled with the photosensitizer in FIG. 17A, averaged over four measurements, each at a separate electrode.
Figure 18:
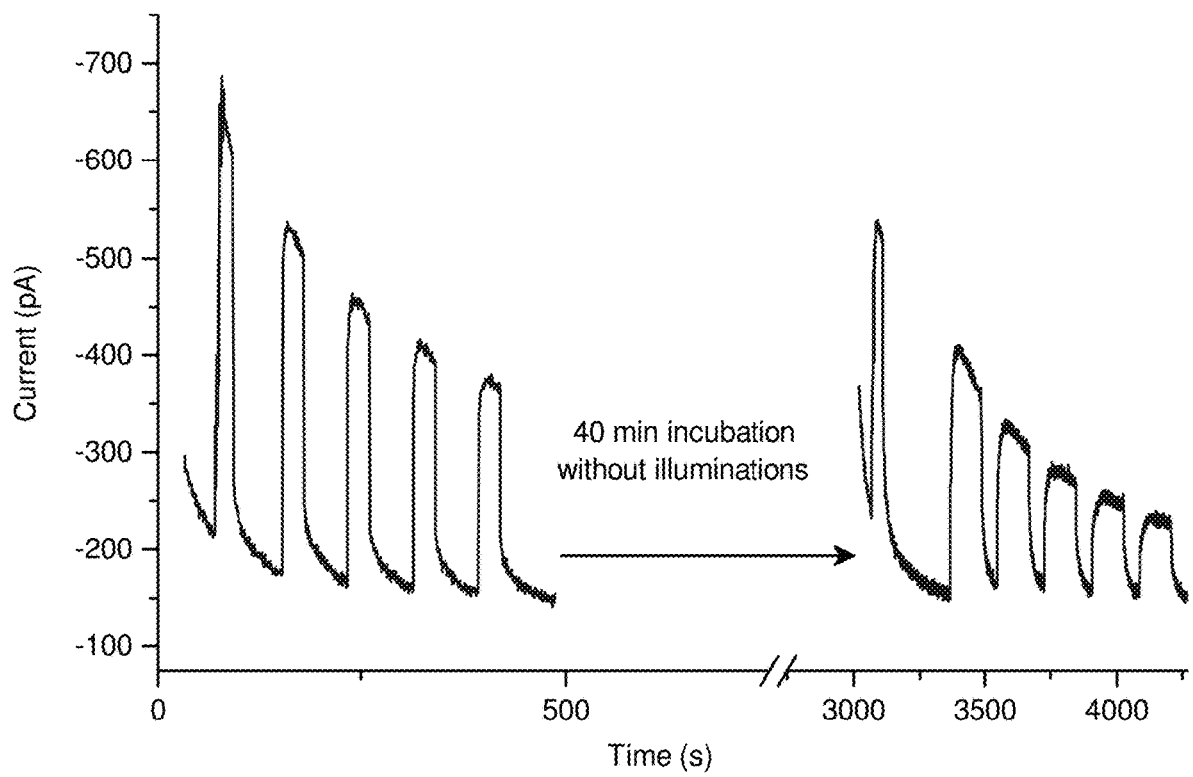
FIG. 18 is an ampometric response of an oligonucleotide in accordance with some embodiments of the disclosure.

As shown in FIG. 17A, the complementary oligonucleotide elicited a clear photocurrent response, but only a very small photocurrent was observed for the non-complementary sequence. The photocurrents, reproducible within a series of four electrodes (FIG. 17B) had an average value of 316 pA (s.d. =11 pA, n=4), a number that exceeded ~12 times the 25 pA (s.d. =13 pA, n=4) average photocurrent in blanks. The signals, however, are time-dependent, dropping by 40% after four sequential illuminations of 30 s (FIG. 18). The decay was likely due to the oxidative DNA cleavage and, possibly the photodegradation of the photosensitizer. Note that the dark photocurrent remained constant for 40 minutes after the electrode incubation in the measuring buffer (FIG. 18). Thus, the signal decay was likely not due to the dissociation of the labeled oligonucleotide from the electrode surface. Nevertheless, the decay of the photocurrent, which reached its maximum after five seconds of illumination is not critical for the one-time detectability of the complementary oligonucleotide due to this fast response of the sensor.

Example 9

Detection of Analyte in a Polluted Environment

Example 9 detects HQ in a water environment polluted with organic materials, which is modeled a 10% ethanol solution. Hydrocarbons have limited solubility in water. Thus, 10% of an organic component, such as ethanol, is rather high.

The supported photosensitizers (Table 3) were prepared by suspending the support particle in an acetone solution of the fluorine containing phthalocyanine of a concentration sufficient to result in about 3% w/w deposition of the fluorine containing phthalocyanine onto the support particle upon the removal of the solvent via evaporation.

The SPE—supported photosensitizers (Table 3) were manufactured by adding a 7 µL drop of an aqueous suspension containing 10 mg mL$^{-1}$ supported photosensitizer on the working electrode surface of SPEs and allowing the water to evaporate completely at room temperature. Measurements were performed and an electrochemical cell containing 20 ml solution that consisted of 0.1 M KCl, 10 mM KH$_2$PO$_4$ (pH=7) and 10% ethanol in water. The electrochemical set-up was the same as that described in Examples 2 under air atmosphere and with no nitrogen purge.

Measurements of the photocurrent for HQ as a function of its concentration reveal that in the absence of ethanol the sensitivity was 0.41 A M$^{-1}$ cm$^{-2}$, corresponding to the limit of detection (LOD) 12 nM.

The UV-Vis spectroscopic examination of the solutions containing 10% ethanol indicated the absence of leached Pc from the electrode.

Photocurrent responses in nanoAmperes (nA), shown as value±standard deviation, were obtained using the supported photosensitizers described below in Table 3 (SPE) and Table 4 (graphite electrode) disposed on an electrode using an analyte solution having 10 μM HQ and another analyte solution include 10 μM HQ and 10vol % ethanol. The photocurrent response in the presence of 10% ethanol ranged from 85 to 112% for the SPE and from 71 to 81% for the graphite electrode to the response in pure water for the same electrode. The comparison of the photocurrent responses for these supported photosensitizers with $TiO_2$—$F_{64}C_{24}PcZn$, which is generally used in most of the examples herein, showed that the these supported photosensitizers resulted in nanomolar LOD, as low as 18 nM. It should be noted, however, that the electrode fabrication parameters were not optimized and thus improved electrode preparation may result even lower LOD, possibly by at least one order of magnitude.

These responses demonstrate the utility of the supported photosensitizers for electrochemical detections even in the presence of a water-miscible organic solvent, such as ethanol.

TABLE 3

| | Photocurrent response ± s.d. (n = 4), nA | |
|---|---|---|
| | 10 μM HQ | 10 μM HQ + 10% ethanol |
| $SiO_2$—$F_{64}C_{24}PcZn$ | 75.6 ± 3.2 (100%) | 64.1 ± 1.8 (84.8%) |
| $SiO_2$—$F_{48}C_{25}O_3H_8PcZn$ | 204.3 ± 1.7 (100%) | 226.8 ± 4.0 (111%) |
| $Al_2O_3$—$F_{64}C_{24}PcZn$ | 174.3 ± 4.9 (100%) | 173.5 ± 2.1 (99.6%) |
| $Al_2O_3$—$F_{48}C_{25}O_3H_8PcZn$ | 221.8 ± 4.6 (100%) | 249.3 ± 6.4 (112%) |
| $TiO_2$—$F_{64}C_{24}PcZn$ | 440.5 ± 7.7 (100%) | n/a |

% shows the residual activity from the value in water for the same electrode. Potential applied, −0.1 V vs SCE; red laser, 655 nm, 30 mW; electrolyte, 0.1M KCl + 0.01M $KH_2PO_4$ pH = 7.

A second type of carbon electrode made of a graphite rod has also been used as an example of conducting surface that is resistant to solvents in general in contrast to SPEs made of carbon paste that can be partially dissolved by organic solvents. The same supported photosensitizers materials as described above for SPE electrodes have also been deposited and photocurrents measured in aqueous solutions containing 10 μM hydroquinone, both in the absence of ethanol and in its presence in 10% concentration. Compared to the value obtained in water, the sensitivity in 10 vol % ethanol ranged from −71-81% for all four of the supported photosensitizers (Table 4).

TABLE 4

| | Photocurrent response ± s.d. (n = 4), nA | |
|---|---|---|
| | 10 μM HQ | 10 μM HQ + 10% ethanol |
| $SiO_2$—F64C24PcZn | 272.9 ± 0.4 (100%) | 221.2 ± 1.8 (81%) |
| $SiO_2$—$F_{48}C_{25}O_3H_8PcZn$ | 472.8 ± 0.4 (100%) | 334.9 ± 5.8 (71%) |
| $Al_2O_3$—$F_{64}C_{24}PcZn$ | 406.0 ± 10.5 (100%) | 313.0 ± 5.7 (77%) |
| $Al_2O_3$—$F_{48}C_{25}O_3H_8PcZn$ | 342.2 ± 7.3 (100%) | 255.5 ± 11.0 (75%) |
| $TiO_2$—$F_{64}C_{24}PcZn$ at SPE | 440.5 ± 7.7 (100%) | n/a |

% shows the residual activity from the value in water for the same electrode. Potential applied, −0.1 V vs SCE; red laser, 655 nm, 30 mW; electrolyte, 0.1M KCl + 0.01M $KH_2PO_4$ pH = 7.

To summarize, the present disclosure describes an electrode including a conductive material, and a photosensitizer coupled to the conductive material, wherein the photosensitizer is a fluorinated phthalocyanine having a metal or a non-metal center; and/or the electrode may include a support particle having the photosensitizer disposed on surfaces thereof; and/or the fluorinated phthalocyanine having the metal or the non-metal center has the following chemical formula, $F_xC_y$-PcM, wherein M is the metal or the non-metal center, Pc is phthalocyanine, x ranges from 1 to 64, and y ranges from 0 to 64; and/or M is selected from the group consisting of $Zn^{2+}$, $Mg^{2+}$, low-spin $Fe^{2+}$, $Ru^{2+}$, $Pt^{2+}$, $Al^{3+}$, $Sc^{3+}$, $Zr^{4+}$, $Ti^{4+}$, $Sb^{5+}$, P, Si, and H; and/or the photosensitizer is represented by the following formula:

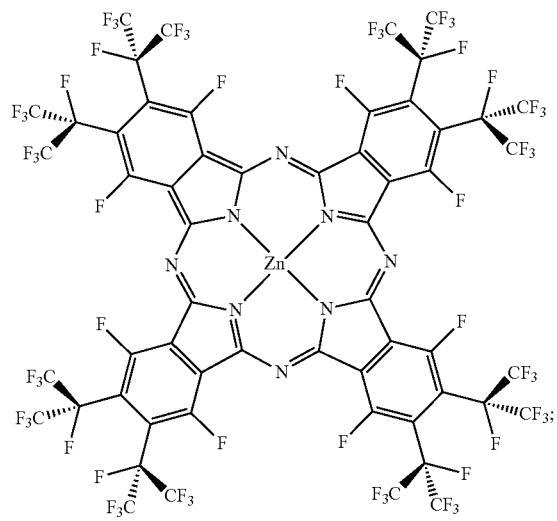

and/or the support particles are selected from the group consisting of $TiO_2$, $SiO_2$, $Al_2O_3$, ZnO), FeO, $Fe_2O_3$, $Fe_3O_4$, $ZrO_2$, and mixtures thereof; and/or the electrode may further comprises a second conductive material, the second conductive material electrically insulated from the conductive material; and/or the electrode may be included in an electrochemical cell, the electrochemical cell including the electrode and a counter electrode.

Also described herein is a method of detecting an analyte including illuminating an analyte solution which contacts an electrode comprising a conductive material having a photosensitizer coupled thereto to generate a reactive oxygen species, wherein the photosensitizer is a fluorinated pthalocyanine having a metal or a non-metal center, oxidizing an analyte present in the analyte solution with the reactive oxygen species to form an oxidized analyte; and detecting a current resulting from the reduction of the oxidized analyte at the electrode; and/or the electrode may further comprises a support particle having the photosensitizer disposed on surfaces thereof; and/or the fluorinated phthalocyanine having the metal center has the following chemical formula, $F_xC_yPcM$, wherein M is the metal or the non-metal center, Pc is phthalocyanine, x ranges from 1 to 64, and y ranges from 0 to 64; and/or M is selected from the group consisting of $Zn^{2+}$, $Mg^{2+}$, low-spin $Fe^{2+}$, $Ru^{2+}$, $Pt^{2+}$, $Al^{3+}$, $SC^{3+}$, $Zr^{4+}$, $Ti^{4+}$, $Sb^{5+}$, P, Si, and H. M is selected from the group consisting of $Zn^{2+}$, $Mg^{2+}$, low-spin $Fe^{2+}$, $Ru^{2+}$, $Pt^{2+}$, $Al^{3+}$, $Sc^{3+}$, $Zr^{4+}$, $Ti^{4+}$, $Sb^{5+}$, P, Si, and H; and/or the photosensitizer is represented by the following formula:

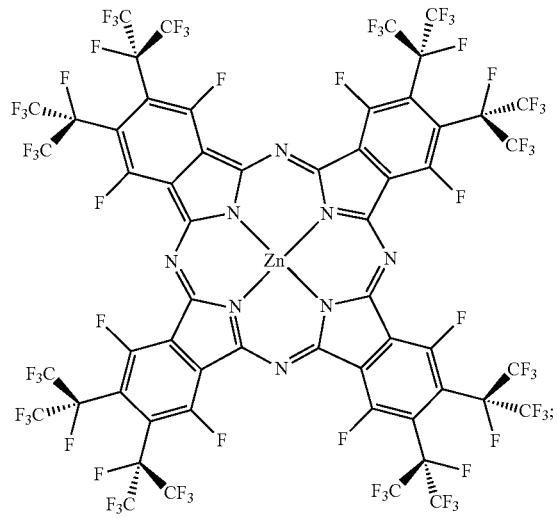

and/or the support particles are selected from the group consisting of $TiO_2$, $SiO_2$, $Al_2O_3$, ZnO), FeO, $Fe_2O_3$, $Fe_3O_4$, $ZrO_2$, and mixtures thereof; and/or the analyte solution includes an organic component; and/or the organic component is ethanol; and/or the organic component is selected from the group including ethanol, acetone, acetonitrile, acetic acid, surfactants, and combinations thereof; and/or the organic component is present in an amount of about 0.1 vol % to about 10 vol % based on the total amount of the analyte solution; and/or the analyte includes a phenol; and/or the phenol is selected from the group consisting of hydroquinone, amoxicillin, cefadroxil, catechol, bisphenol A, 2-chlorphenol, 3-chlorphenol, 4-chlorphenol, polychlorinated phenols, 2-nitrophenol, 3-nitrophenol, 4-nitrophenol, aniline, 2-aminophenol, 3-aminophenol, 4-aminophenol, 2-amino-4-chlorophenol, 4-cyanophenol, 4-methylphenol, 3,3',5,5'-tetramethylbenzidine, and mixtures thereof; and/or the electrode includes a second conductive material, the second conductive material electrically insulated from the from the conductive material, and wherein the analyte solution is in the form of a drop that contacts the conductive material and the second conductive material; and/or the electrode is part of an electrochemical cell, the electrochemical cell containing the analyte solution and including a second electrode, wherein the electrode and the second electrode are partially immersed in the analyte solution.

Also described herein is a method of detecting a biomolecule including exposing an electrode having a first oligonucleotide disposed thereon to a photosensitizer coupled to a second oligonucleotide, wherein the first and second oligonucleotide are complimentary and wherein the photosensitizer is coupled to the electrode through complimentary coupling of the first and second oligonucelotides, illuminating the photosensitizer to generate a reactive oxygen species, and detecting a current resulting from reduction of the reactive oxygen species at the electrode.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. An electrode, comprising:
    a conductive material;
    a support particle; and
    a photosensitizer,
    wherein the support particle has the photosensitizer disposed on the surfaces thereof,
        wherein the photosensitizer is coupled to the conductive material, and
    wherein the photosensitizer is a fluorinated phthalocyanine having a metal or a non-metal center.

2. The electrode of claim 1, wherein the fluorinated phthalocyanine having the metal or the non-metal center has the following chemical formula:

$$F_xC_yPcM$$

wherein M is the metal or the non-metal center, Pc is phthalocyanine, x ranges from 1 to 64, and y ranges from 0 to 64.

3. The electrode of claim 2, wherein M is selected from the group consisting of $Zn^{2+}$, $Mg^{2+}$, low-spin $Fe^{2+}$, $Ru^{2+}$, $Pt^{2+}$, $Al^{3+}$, $Sc^{3+}$, $Zr^{4+}$, $Ti^{4+}$, $Sb^{5+}$, P, Si, and H.

4. The electrode of claim 1, wherein the photosensitizer is represented by the following formula:

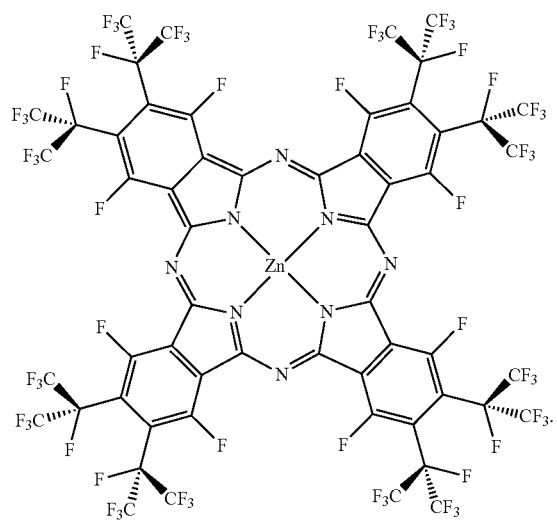

5. The electrode of claim 1, where the support particle is selected from the group consisting of $TiO_2$, $SiO_2$, $Al_2O_3$, ZnO, FeO, $Fe_2O_3$, $Fe_3O_4$, $ZrO_2$, and mixtures thereof.

6. The electrode of claim 1, further comprising:

a second conductive material, the second conductive material electrically insulated from the conductive material.

7. An electrochemical cell, comprising:

the electrode of claim 1; and a counter electrode.

8. A method of detecting an analyte, comprising:

illuminating an analyte solution which contacts an electrode comprising a conductive material having a photosensitizer coupled thereto to generate a reactive oxygen species, wherein the photosensitizer is a fluorinated phthalocyanine having a metal or a non-metal center;

oxidizing an analyte present in the analyte solution with the reactive oxygen species to form an oxidized analyte; and detecting a current resulting from the reduction of the oxidized analyte at the electrode.

9. The method of claim 8, wherein the electrode further comprises a support particle having the photosensitizer disposed on surfaces thereof.

10. The method of claim 9, where the support particle is selected from the group consisting of $TiO_2$, $SiO_2$, $Al_2O_3$, ZnO, FeO, $Fe_2O_3$, $Fe_3O_4$, $ZrO_2$, and mixtures thereof.

11. The method of claim 8, wherein the fluorinated phthalocyanine having the metal center has the following chemical formula:

$F_xC_yPcM$ wherein M is the metal or the non-metal center, Pc is phthalocyanine, x ranges from 1 to 64, and y ranges from 0 to 64.

12. The method of claim 11, wherein M is selected from the group of $Zn^{2+}$, $Mg^{2+}$, low-spin $Fe^{2+}$, $Ru^{2+}$, $Pt^{2+}$, $Al^{3+}$, $Sc^{3+}$, $Zr^{4+}$, $Ti^{4+}$, $Sb^{5+}$, P, Si, and H. M is selected from the group consisting of $Zn^{2+}$, $Mg^{2+}$, low-spin $Fe^{2+}$, $Ru^{2+}$, $Pt^{2+}$, $Al^{3+}$, $Sc^{3+}$, $Zr^{4+}$, $Ti^{4+}$, $Sb^{5+}$, P, Si, and H.

13. The method of claim 8, wherein the photosensitizer is represented by the following formula:

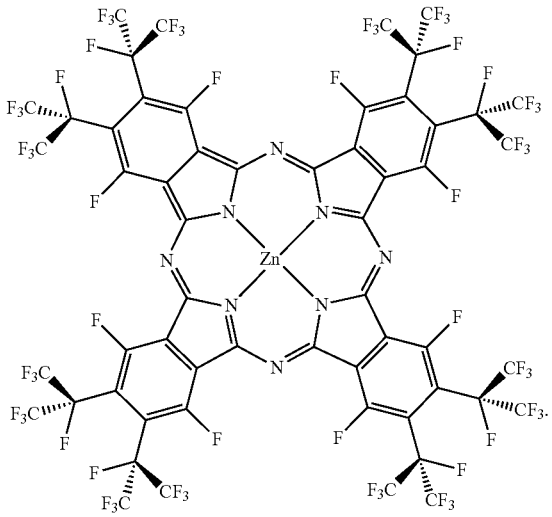

14. The method of claim 8, wherein the analyte solution includes an organic component.

15. The method of claim 14, wherein the organic component is ethanol.

16. The method of claim 8, wherein the analyte includes a phenol.

17. The method of claim 16, wherein the phenol is selected from the group consisting of hydroquinone, amoxicillin, cefadroxil, catechol, bisphenol A, 2-chlorphenol, 3-chlorphenol, 4-chlorphenol, polychlorinated phenols, 2-nitrophenol, 3-nitrophenol, 4-nitrophenol, aniline, 2-aminophenol, 3-aminophenol, 4-aminophenol, 2-amino-4-chlorophenol, 4-cyanophenol, 4-methylphenol, 3,3',5,5'-tetramethylbenzidine, and mixtures thereof.

18. The method of claim 8, wherein the electrode includes a second conductive material, the second conductive material electrically insulated from the conductive material, and wherein the analyte solution is in the form of a drop that contacts the conductive material and the second conductive material.

19. The method of claim 8, wherein the electrode is part of an electrochemical cell, the electrochemical cell containing the analyte solution and including a second electrode, wherein the electrode and the second electrode are partially immersed in the analyte solution.

* * * * *